(12) United States Patent
Tait et al.

(10) Patent No.: US 9,594,250 B2
(45) Date of Patent: *Mar. 14, 2017

(54) ULTRA-PORTABLE COORDINATE MEASUREMENT MACHINE

(71) Applicant: Hexagon Metrology, Inc., North Kingstown, RI (US)

(72) Inventors: Hogar Tait, Temecula, CA (US); Paul Ferrari, Carlsbad, CA (US); Knut Siercks, Morschwil (CH)

(73) Assignee: Hexagon Metrology, Inc., North Kingstown, RI (US)

( * ) Notice: Subject to any disclaimer, the term of this patent is extended or adjusted under 35 U.S.C. 154(b) by 105 days.

This patent is subject to a terminal disclaimer.

(21) Appl. No.: 14/575,674

(22) Filed: Dec. 18, 2014

(65) Prior Publication Data

US 2015/0176972 A1 Jun. 25, 2015

Related U.S. Application Data

(63) Continuation-in-part of application No. 14/133,365, filed on Dec. 18, 2013, now Pat. No. 9,163,921.

(51) Int. Cl.
| | |
|---|---|
| *G01B 5/008* | (2006.01) |
| *G02B 27/01* | (2006.01) |
| *G01B 5/00* | (2006.01) |
| *G01B 11/00* | (2006.01) |
| *G01B 11/25* | (2006.01) |

(52) U.S. Cl.
CPC ......... *G02B 27/017* (2013.01); *G01B 5/0004* (2013.01); *G01B 5/008* (2013.01); *G01B 11/002* (2013.01); *G01B 11/25* (2013.01); *G02B 2027/0178* (2013.01)

(58) Field of Classification Search
CPC ......... G01B 5/004; G01B 5/008; G01B 21/04
USPC .......................................................... 33/503
See application file for complete search history.

(56) References Cited

U.S. PATENT DOCUMENTS

| | | | |
|---|---|---|---|
| 4,492,036 | A | 1/1985 | Beckwith |
| 4,972,090 | A | 11/1990 | Eaton |
| 5,084,981 | A | 2/1992 | McMurtry et al. |
| 5,088,337 | A | 2/1992 | Bennett |
| 5,148,377 | A | 9/1992 | McDonald |

(Continued)

FOREIGN PATENT DOCUMENTS

| | | |
|---|---|---|
| DE | 4345091 | 7/1995 |
| DE | 10112977 | 11/2002 |

(Continued)

*Primary Examiner* — G. Bradley Bennett
(74) *Attorney, Agent, or Firm* — Knobbe, Martens, Olson & Bear LLP

(57) ABSTRACT

In some embodiments, an articulated arm coordinate measurement machine can include a plurality of transfer members and a plurality of articulation members connecting the plurality of transfer members to each other to measure an angle between the transfer members. The machine can additionally include at least one coordinate acquisition member positioned at an end of the articulated arm. Further, the machine can include a harness connected to at least one of the group consisting of the transfer members and the articulation members to support at least a portion of the weight of the transfer members and the articulation members. The harness can also be configured to mount to a human.

38 Claims, 21 Drawing Sheets

(56) References Cited

U.S. PATENT DOCUMENTS

| | | | |
|---|---|---|---|
| 5,187,874 A | 2/1993 | Takahashi et al. | |
| 5,189,797 A | 3/1993 | Granger | |
| 5,251,156 A | 10/1993 | Heier et al. | |
| 5,396,712 A | 3/1995 | Herzog | |
| 5,408,754 A | 4/1995 | Raab | |
| 5,412,880 A | 5/1995 | Raab | |
| 5,505,003 A | 4/1996 | Evans et al. | |
| 5,510,977 A | 4/1996 | Raab | |
| 5,521,847 A | 5/1996 | Ostrowski et al. | |
| 5,526,576 A | 6/1996 | Fuchs et al. | |
| 5,528,505 A | 6/1996 | Granger et al. | |
| 5,611,147 A | 3/1997 | Raab | |
| 5,615,489 A | 4/1997 | Breyer et al. | |
| 5,757,499 A * | 5/1998 | Eaton | G01S 5/16 356/141.3 |
| 5,768,792 A | 6/1998 | Raab | |
| 5,794,356 A | 8/1998 | Raab | |
| 5,822,450 A | 10/1998 | Arakawa et al. | |
| 5,829,148 A * | 11/1998 | Eaton | G01B 5/008 33/1 PT |
| 5,978,748 A | 11/1999 | Raab | |
| 5,991,704 A | 11/1999 | Rekar et al. | |
| 6,134,506 A | 10/2000 | Rosenberg et al. | |
| 6,151,789 A | 11/2000 | Raab | |
| 6,161,079 A | 12/2000 | Zink et al. | |
| 6,166,811 A | 12/2000 | Long et al. | |
| 6,219,928 B1 | 4/2001 | Raab et al. | |
| 6,366,831 B1 | 4/2002 | Raab | |
| 6,430,828 B1 | 8/2002 | Ulbrich | |
| 6,487,896 B1 | 12/2002 | Dall'Aglio | |
| 6,526,670 B1 | 3/2003 | Carli | |
| 6,598,306 B2 | 7/2003 | Eaton | |
| 6,611,346 B2 | 8/2003 | Granger | |
| 6,611,617 B1 | 8/2003 | Crampton | |
| 6,618,496 B1 | 9/2003 | Tassakos et al. | |
| 6,668,466 B1 | 12/2003 | Bieg et al. | |
| 6,759,648 B2 | 7/2004 | Baxter et al. | |
| 6,817,108 B2 * | 11/2004 | Eaton | G01B 21/047 33/503 |
| 6,892,465 B2 | 5/2005 | Raab et al. | |
| 6,904,691 B2 | 6/2005 | Raab et al. | |
| 6,925,722 B2 | 8/2005 | Raab et al. | |
| 6,931,745 B2 * | 8/2005 | Granger | H01R 35/04 33/1 PT |
| 6,952,882 B2 | 10/2005 | Raab et al. | |
| 6,984,236 B2 | 1/2006 | Raab | |
| 6,988,322 B2 | 1/2006 | Raab et al. | |
| 7,003,892 B2 | 2/2006 | Eaton et al. | |
| 7,017,275 B2 | 3/2006 | Raab et al. | |
| 7,043,847 B2 | 5/2006 | Raab et al. | |
| 7,051,450 B2 | 5/2006 | Raab et al. | |
| 7,069,664 B2 | 7/2006 | Raab et al. | |
| 7,073,271 B2 * | 7/2006 | Raab | G01B 5/008 33/1 N |
| 7,096,077 B2 | 8/2006 | Price et al. | |
| 7,131,952 B1 * | 11/2006 | Dickholtz, Sr. | A61B 5/0064 33/512 |
| 7,152,456 B2 | 12/2006 | Eaton | |
| 7,174,651 B2 | 2/2007 | Raab et al. | |
| 7,269,910 B2 | 9/2007 | Raab et al. | |
| 7,296,364 B2 | 11/2007 | Seitz et al. | |
| 7,296,979 B2 | 11/2007 | Raab et al. | |
| 7,372,581 B2 | 5/2008 | Raab et al. | |
| 7,395,606 B2 | 7/2008 | Crampton | |
| 7,441,341 B2 | 10/2008 | Eaton | |
| 7,525,276 B2 | 4/2009 | Eaton | |
| 7,546,689 B2 | 6/2009 | Ferrari et al. | |
| 7,568,293 B2 | 8/2009 | Ferrari | |
| 7,578,069 B2 | 8/2009 | Eaton | |
| D599,226 S | 9/2009 | Gerent et al. | |
| 7,624,510 B2 | 12/2009 | Ferrari | |
| 7,640,674 B2 | 1/2010 | Ferrari et al. | |
| 7,676,945 B2 | 3/2010 | Prestidge et al. | |
| 7,693,325 B2 | 4/2010 | Pulla et al. | |
| 7,743,524 B2 | 6/2010 | Eaton et al. | |
| 7,774,949 B2 | 8/2010 | Ferrari | |
| 7,779,548 B2 | 8/2010 | Ferrari | |
| 7,784,194 B2 | 8/2010 | Raab et al. | |
| 7,797,849 B2 | 9/2010 | Gomez | |
| 7,805,854 B2 | 10/2010 | Eaton | |
| 7,908,757 B2 | 3/2011 | Ferrari | |
| 7,984,558 B2 | 7/2011 | Ferrari | |
| D643,319 S | 8/2011 | Ferrari et al. | |
| 8,001,697 B2 | 8/2011 | Danielson et al. | |
| 8,015,721 B2 | 9/2011 | Eaton et al. | |
| 8,082,673 B2 | 12/2011 | Desforges et al. | |
| 8,099,877 B2 | 1/2012 | Champ | |
| 8,104,189 B2 | 1/2012 | Tait | |
| 8,112,896 B2 | 2/2012 | Ferrari et al. | |
| 8,122,610 B2 | 2/2012 | Tait et al. | |
| 8,123,350 B2 | 2/2012 | Cannell et al. | |
| 8,127,458 B1 | 3/2012 | Ferrari | |
| 8,145,446 B2 | 3/2012 | Atwell et al. | |
| 8,151,477 B2 | 4/2012 | Tait | |
| 8,176,646 B2 | 5/2012 | Ferrari | |
| 8,201,341 B2 | 6/2012 | Ferrari | |
| 8,220,173 B2 | 7/2012 | Tait | |
| 8,229,208 B2 | 7/2012 | Pulla et al. | |
| 8,327,555 B2 | 12/2012 | Champ | |
| 8,336,220 B2 | 12/2012 | Eaton et al. | |
| 8,384,914 B2 | 2/2013 | Becker et al. | |
| 8,402,669 B2 | 3/2013 | Ferrari et al. | |
| 8,437,011 B2 | 5/2013 | Steffensen et al. | |
| 8,467,071 B2 | 6/2013 | Steffey et al. | |
| 8,467,072 B2 | 6/2013 | Cramer et al. | |
| 8,472,029 B2 | 6/2013 | Bridges et al. | |
| 8,497,901 B2 | 7/2013 | Pettersson | |
| 8,511,891 B2 | 8/2013 | Cramer et al. | |
| 8,537,371 B2 | 9/2013 | Steffensen et al. | |
| 8,537,375 B2 | 9/2013 | Steffensen et al. | |
| 8,537,376 B2 | 9/2013 | Brown et al. | |
| 8,558,992 B2 | 10/2013 | Steffey | |
| 8,570,493 B2 | 10/2013 | Mertz et al. | |
| 8,576,380 B2 | 11/2013 | Steffensen et al. | |
| 8,619,265 B2 | 12/2013 | Steffey et al. | |
| 8,625,106 B2 | 1/2014 | Ossig et al. | |
| 8,654,354 B2 | 2/2014 | Steffensen et al. | |
| 8,654,355 B2 | 2/2014 | Steffensen et al. | |
| 8,659,752 B2 | 2/2014 | Cramer et al. | |
| 8,670,114 B2 | 3/2014 | Bridges et al. | |
| 8,681,320 B2 | 3/2014 | Day et al. | |
| 8,699,007 B2 | 4/2014 | Becker et al. | |
| 8,699,036 B2 | 4/2014 | Ditte et al. | |
| 8,705,012 B2 | 4/2014 | Greiner et al. | |
| 8,705,016 B2 | 4/2014 | Schumann et al. | |
| 8,724,119 B2 | 5/2014 | Steffey et al. | |
| 8,724,120 B2 | 5/2014 | Steffey et al. | |
| 8,730,477 B2 | 5/2014 | Ruhland et al. | |
| 8,740,396 B2 | 6/2014 | Brown et al. | |
| 8,830,485 B2 | 9/2014 | Woloschyn | |
| 8,842,259 B2 | 9/2014 | Garey et al. | |
| 8,848,203 B2 | 9/2014 | Bridges et al. | |
| 8,896,819 B2 | 11/2014 | Schumann et al. | |
| 8,896,848 B2 | 11/2014 | Steffensen et al. | |
| 8,902,408 B2 | 12/2014 | Bridges | |
| 8,908,154 B2 | 12/2014 | Bridges et al. | |
| 8,947,678 B2 | 2/2015 | Bridges | |
| 8,958,055 B2 | 2/2015 | Bridges et al. | |
| 8,970,823 B2 | 3/2015 | Heidemann et al. | |
| 2002/0100884 A1 | 8/2002 | Maddock | |
| 2008/0016711 A1 | 1/2008 | Baebler | |
| 2009/0271996 A1 * | 11/2009 | Ferrari | G01B 21/042 33/502 |
| 2010/0274390 A1 * | 10/2010 | Walser | B25J 9/1697 700/259 |
| 2011/0112786 A1 | 5/2011 | Desforges et al. | |
| 2011/0131008 A1 * | 6/2011 | Swanson | G01B 5/004 702/152 |
| 2011/0170534 A1 | 7/2011 | York | |
| 2011/0175745 A1 | 7/2011 | Atwell et al. | |
| 2011/0213247 A1 | 9/2011 | Shammas | |
| 2012/0033069 A1 | 2/2012 | Becker et al. | |
| 2012/0050712 A1 | 3/2012 | Bridges et al. | |

(56) References Cited

U.S. PATENT DOCUMENTS

| | | |
|---|---|---|
| 2012/0057174 A1 | 3/2012 | Briggs |
| 2012/0069324 A1 | 3/2012 | Ansari et al. |
| 2012/0070077 A1 | 3/2012 | Ossig et al. |
| 2012/0099096 A1 | 4/2012 | Bridges et al. |
| 2012/0140244 A1 | 6/2012 | Gittinger et al. |
| 2012/0206808 A1 | 8/2012 | Brown et al. |
| 2012/0229788 A1 | 9/2012 | Schumann et al. |
| 2012/0262550 A1 | 10/2012 | Bridges |
| 2012/0262573 A1 | 10/2012 | Bridges |
| 2012/0262697 A1 | 10/2012 | Mertz et al. |
| 2012/0265479 A1 | 10/2012 | Bridges |
| 2013/0155386 A1 | 6/2013 | Bridges |
| 2013/0201487 A1 | 8/2013 | Ossig et al. |
| 2013/0202010 A1 | 8/2013 | Cramer et al. |
| 2013/0293684 A1 | 11/2013 | Becker et al. |
| 2013/0308117 A1 | 11/2013 | Bridges |
| 2014/0022555 A1 | 1/2014 | Ossig et al. |
| 2014/0028805 A1 | 1/2014 | Tohme |
| 2014/0031723 A1* | 1/2014 | Galea .................... G01B 21/04 600/595 |
| 2014/0063489 A1 | 3/2014 | Steffey et al. |
| 2014/0078519 A1 | 3/2014 | Steffey et al. |
| 2014/0098382 A1 | 4/2014 | Bridges et al. |
| 2014/0098383 A1 | 4/2014 | Bridges |
| 2014/0156218 A1* | 6/2014 | Kim ..................... A61B 5/1114 702/150 |
| 2014/0168370 A1 | 6/2014 | Heidemann et al. |
| 2014/0168379 A1 | 6/2014 | Heidemann et al. |
| 2014/0185059 A1 | 7/2014 | Steffey et al. |
| 2014/0226145 A1 | 8/2014 | Steffey et al. |
| 2014/0226190 A1 | 8/2014 | Bridges et al. |
| 2014/0259714 A1 | 9/2014 | Atwell et al. |
| 2014/0267619 A1 | 9/2014 | Bridges |
| 2014/0267620 A1 | 9/2014 | Bridges |
| 2014/0267623 A1 | 9/2014 | Bridges et al. |
| 2014/0267629 A1 | 9/2014 | Tohme et al. |
| 2014/0268093 A1 | 9/2014 | Tohme et al. |
| 2014/0268178 A1 | 9/2014 | Atwell et al. |
| 2014/0300906 A1 | 10/2014 | Becker et al. |
| 2014/0327920 A1 | 11/2014 | Bridges et al. |
| 2014/0340750 A1 | 11/2014 | Neal et al. |
| 2014/0362424 A1 | 12/2014 | Bridges et al. |
| 2015/0219451 A1* | 8/2015 | Pettersson .............. G01B 5/008 33/503 |

FOREIGN PATENT DOCUMENTS

| | | |
|---|---|---|
| EP | 0522610 | 1/1993 |
| FR | 2740546 | 4/1997 |
| GB | 2274526 | 7/1994 |
| JP | 05/031685 | 2/1993 |
| JP | 2003/021133 | 1/2003 |
| JP | 2003/175484 | 6/2003 |
| WO | WO 98/08050 | 2/1998 |

* cited by examiner

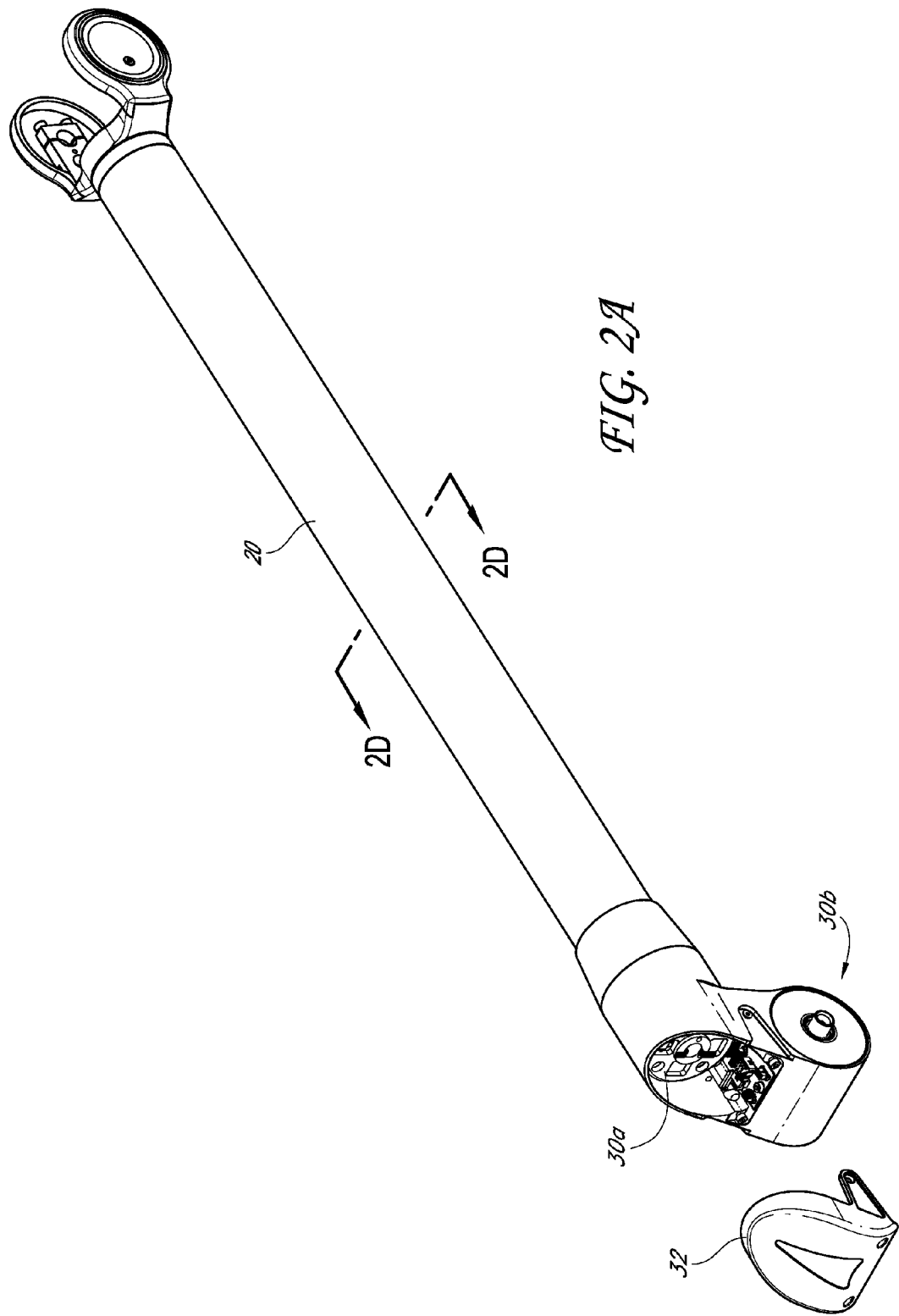

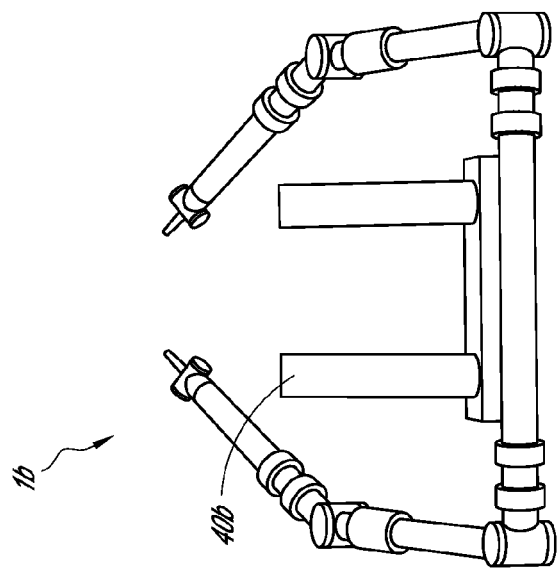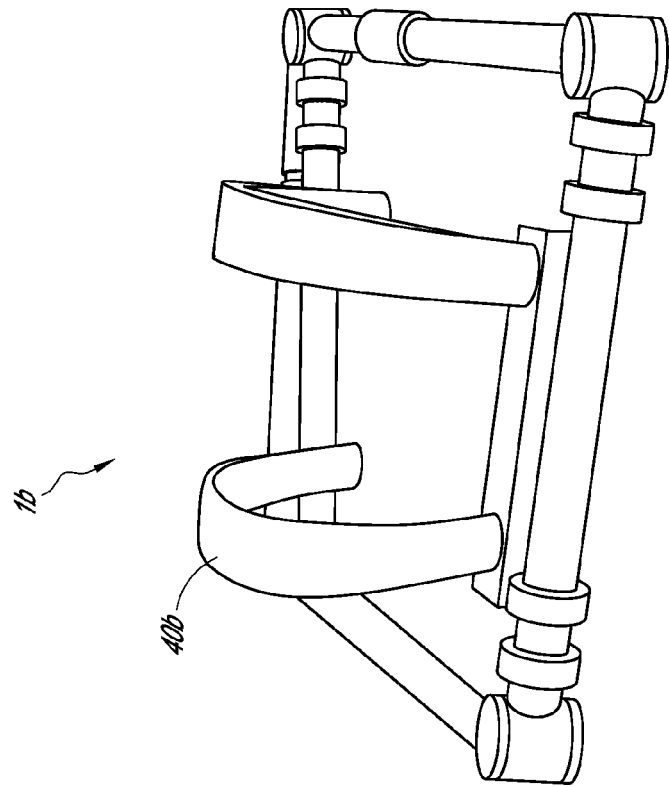
FIG. 4

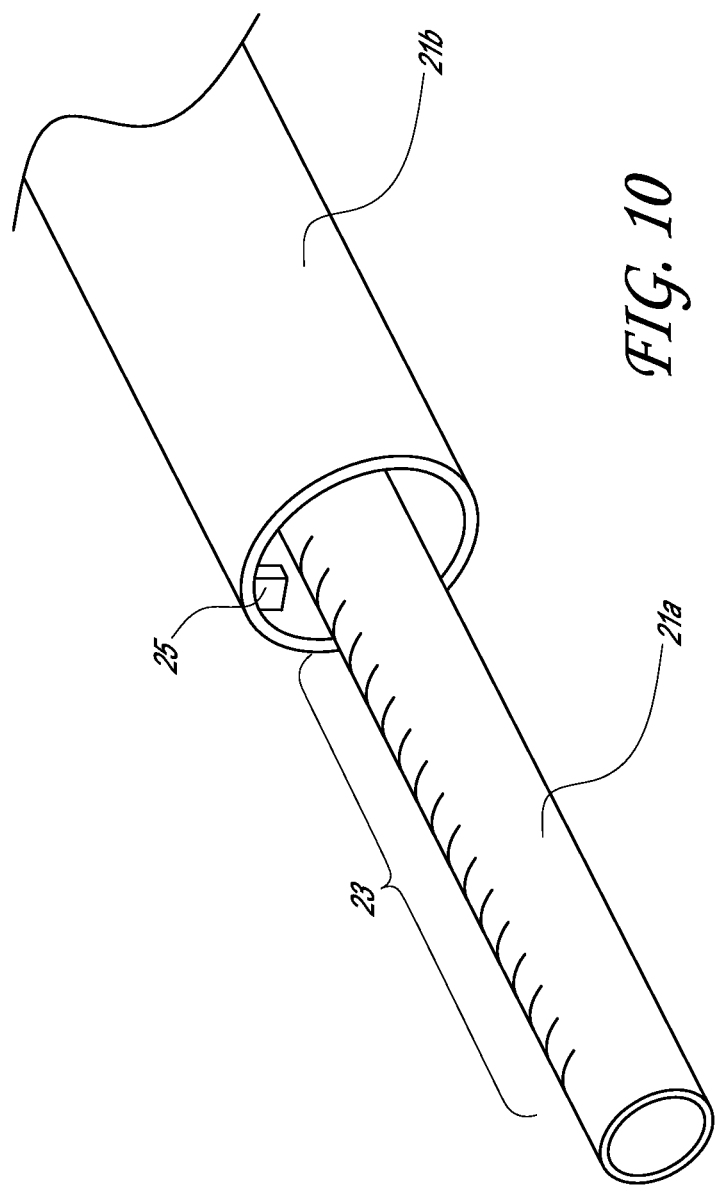

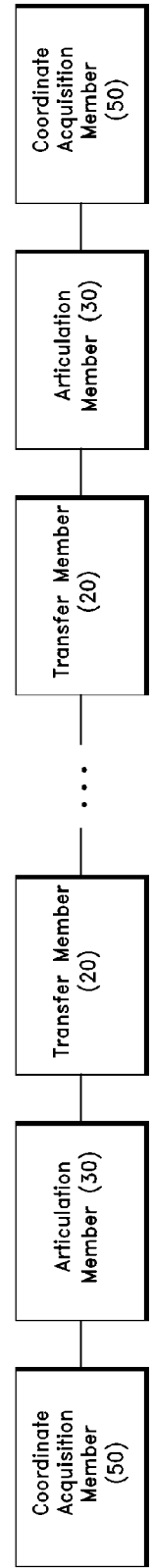
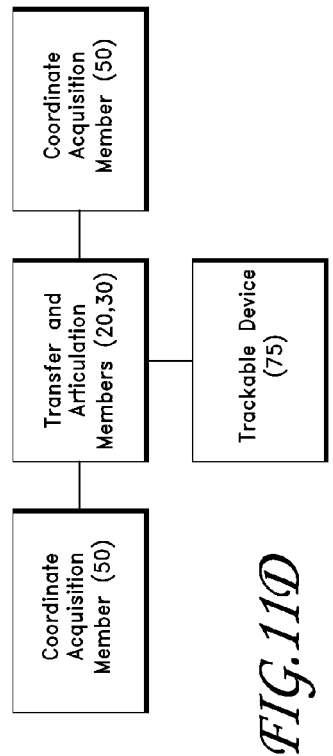
FIG.11A
FIG.11B
FIG.11C
FIG.11D

ULTRA-PORTABLE COORDINATE MEASUREMENT MACHINE

CROSS-REFERENCE TO RELATED APPLICATIONS

This application is a continuation-in-part of U.S. application Ser. No. 14/133,365, filed 18 Dec. 2013. The entirety of the related applications is hereby incorporated by reference.

BACKGROUND

Field

The present invention relates to coordinate measurement, and more particularly to mobile coordinate measurement machines.

Description of the Related Art

Rectilinear measuring systems, also referred to as coordinate measuring machines and articulated arm measuring machines, are used to generate highly accurate geometry information. In general, these instruments capture the structural characteristics of an object for use in quality control, electronic rendering and/or duplication. One example of a conventional apparatus used for coordinate data acquisition is a portable coordinate measuring machine (PCMM), which is a portable device capable of taking highly accurate measurements within a measuring sphere of the device. Such devices often include a probe mounted on an end of an arm that includes a plurality of transfer members connected together by joints. The end of the arm opposite the probe is typically coupled to a moveable base. Typically, the joints are broken down into singular rotational degrees of freedom, each of which is measured using a dedicated rotational transducer. During a measurement, the probe of the arm is moved manually by an operator to various points in the measurement sphere. At each point, the position of each of the joints must be determined at a given instant in time. Accordingly, each transducer outputs an electrical signal that varies according to the movement of the joint in that degree of freedom. Typically, the probe also generates a signal. These position signals and the probe signal are transferred through the arm to a recorder/analyzer. The position signals are then used to determine the position of the probe within the measurement sphere. See e.g., U.S. Pat. Nos. 5,829,148; 7,174,651; and 8,112,896, issued on 3 Nov. 1998, 13 Feb. 2007, and 14 Feb. 2012, respectively, which are incorporated herein by reference in their entireties.

Generally, these devices are mounted on a stable and rigid surface such as a table. In some instances, they may be rigidly attached to said surface by fasteners, suction devices, or the like. Such mounting techniques reduce the portability of the coordinate measurement machine. The disclosure herein provides improvements of at least some of these qualities.

SUMMARY

In some embodiments, an articulated arm coordinate measurement machine can include a plurality of transfer members and a plurality of articulation members connecting the plurality of transfer members to each other to measure an angle between the transfer members. The machine can additionally include at least one coordinate acquisition member positioned at an end of the articulated arm. Further, the machine can include a harness connected to at least one of the group consisting of the transfer members and the articulation members to support at least a portion of the weight of the transfer members and the articulation members. The harness can also be configured to mount to a human.

In further embodiments, an articulated arm coordinate measurement machine can include a plurality of transfer members and a plurality of articulation members connecting the plurality of transfer members to each other to measure an angle between the transfer members. The machine can additionally include at least one coordinate acquisition member, positioned at an end of the articulated arm. Further, the machine can include a trackable device mounted on the articulated arm. The trackable device can be configured to facilitate measurement of the location of the articulated arm coordinate measurement machine in space.

In further embodiments, a method can be provided for measuring one or more points. An articulated arm coordinate measurement machine can be mounted to a single person. One or more objects can then be measured with the articulated arm coordinate measurement machine while the articulated arm coordinate measurement machine is mounted to the single person.

In further embodiments, a method can be provided for measuring one or more points. An articulated arm coordinate measurement machine with a plurality of transfer members and articulation members can be carried by a user. One or more objects can then be measured with the articulated arm coordinate measurement machine while carried by the user. The location of the articulated arm coordinate measurement machine can then be tracked while measuring said one or more objects.

In further embodiments, a coordinate measurement machine can include a harness and a coordinate measuring machine. The harness can be configured to mount to a human, and the coordinate measuring machine's entire weight can be configured to be supported by the human through the harness when worn by the human. The coordinate measuring machine can include at least one of an articulated arm comprising a plurality of transfer members and a plurality of articulation members connecting the plurality of transfer members to each other to measure an angle between the transfer members; and an optical coordinate acquisition member.

In further embodiments, a coordinate measurement machine can include a trackable device and at least at least one of an articulated arm comprising a plurality of transfer members and a plurality of articulating members connecting the plurality of transfer members to each other to measure an angle between the transfer members; and an optical coordinate acquisition member. Further, a trackable device can be mounted on the coordinate measurement machine, the trackable device being configured to facilitate measurement of the location of the coordinate measurement machine in space. The coordinate measurement machine can also be configured to be mounted to a user for hands-free use.

In further embodiments, a method for measuring one or more points can be provided. A coordinate measurement machine including an optical coordinate acquisition member can be mounted to a single person. The coordinate measurement machine can be used to measure one or more objects while the coordinate measurement machine is mounted to the single person.

In further embodiments, another method for measuring one or more points can be provided. A user can carry a coordinate measurement machine including an optical coordinate acquisition member. The coordinate measurement machine can measure one or more objects while carried by the user. Further, a location of the coordinate measurement machine can be tracked while measuring said one or more objects.

In further embodiments, a coordinate measurement machine can include a trackable device mounted on the coordinate measurement machine. The trackable device can be configured to facilitate measurement of the location of the coordinate measurement machine in space.

BRIEF DESCRIPTION OF THE DRAWINGS

Further objects, features and advantages of the invention will become apparent from the following detailed description taken in conjunction with the accompanying figures showing illustrative embodiments of the invention, in which:

FIG. 2A is a partially exploded view of a transfer member and multiple articulation members of the ultra-portable articulated arm coordinate measurement machine of FIG. 1.

FIG. 4 is a perspective view of a further embodiment ultra-portable articulated arm coordinate measurement machine in folded and un-folded configurations.

FIG. 10 is a perspective view of a telescoping transfer member.

FIGS. 11A-11D and 12 are schematic drawings of various embodiment ultra-portable articulated arm coordinate measurement machines.

DETAILED DESCRIPTION OF THE PREFERRED EMBODIMENTS

Figure 1:
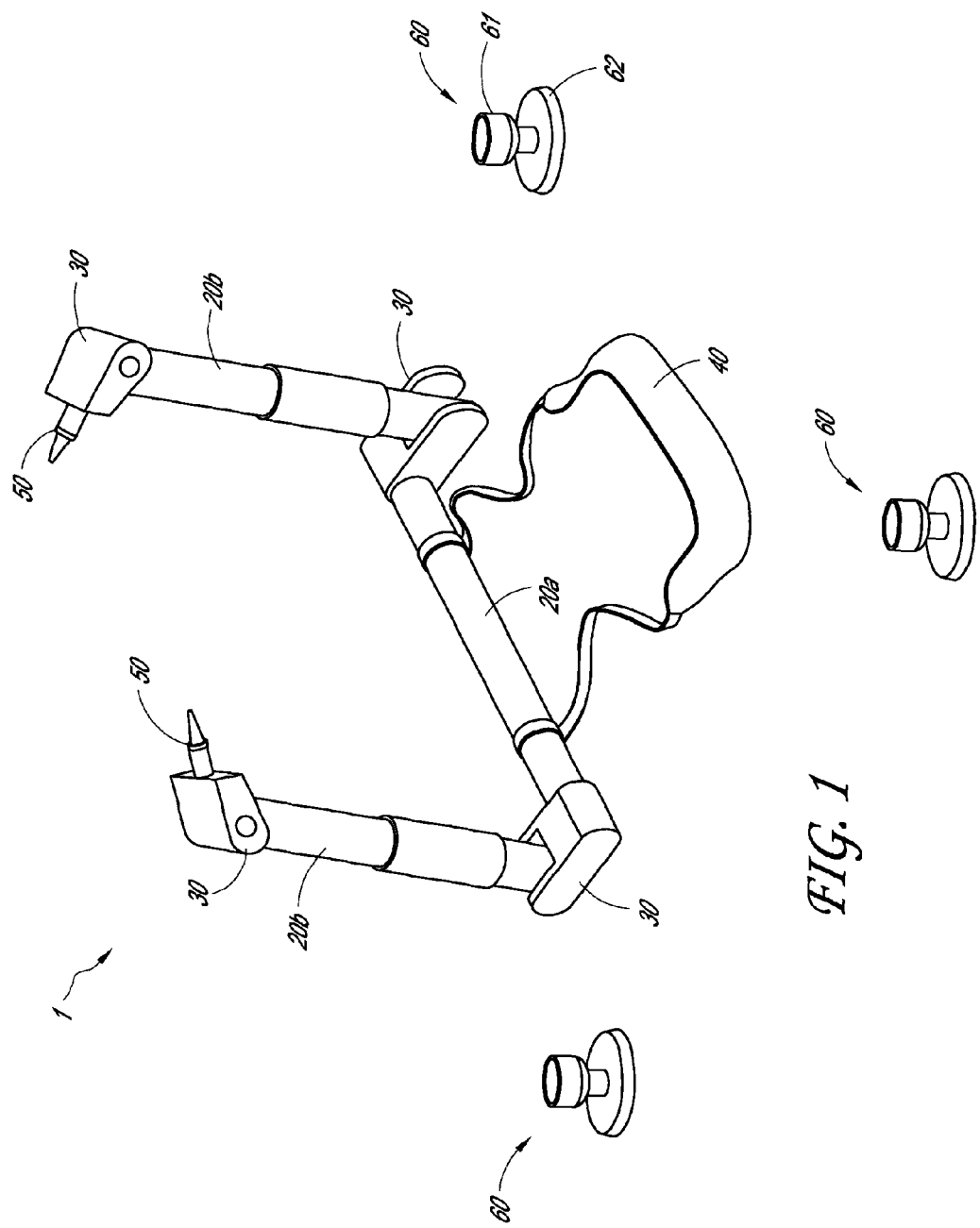
FIG. 1 is a perspective view of an embodiment ultra-portable articulated arm coordinate measurement machine system.

FIG. 1 illustrates one embodiment of an ultra-portable coordinate measuring machine ("UPCMM") 1. In the illustrated embodiment, the UPCMM 1 includes a plurality of rigid transfer members 20, two coordinate acquisition members 50 on opposite ends of the UPCMM, and a plurality of articulation members 30 that form "joint assemblies" connecting the rigid transfer members 20 and coordinate acquisition members 50 to one another. In particular, the UPCMM 1 includes a middle transfer member 20a and two side transfer members 20b attached at opposite ends of the middle transfer member. The articulation members 30 along with the transfer members 20 are configured to impart one or more rotational and/or angular degrees of freedom. Through the various members 20, 30, the UPCMM 1 can be aligned in various spatial orientations thereby allowing fine positioning and orientating of the coordinate acquisition members 50 in three dimensional space.

The position of the rigid transfer members 20 and the coordinate acquisition members 50 may be adjusted using manual, robotic, semi-robotic and/or any other adjustment method. However, as discussed herein, in some embodiments it may be particularly desirable for the rigid transfer members 20 and the coordinate acquisition members 50 to be adjusted manually. In one embodiment depicted in FIG. 1, the UPCMM 1, through the various articulation members 30, is provided with eight rotary axes of movement. However, there is no strict limitation to the number of axes of movement that may be used, and fewer or additional axes of movement may be incorporated into the UPCMM design. For example, UPCMM 1a, depicted in FIG. 3 includes two additional transfer members, and uses a backpack-style harness 40a that can act as a middle transfer member 20a. Further, the UPCMM 1a can include four additional axes of movement. In some embodiments, the UPCMM 1a can be considered to have transfer members 20 and articulation members 30 that correspond to human wrist, elbow, and shoulder joints. Unless otherwise stated, all references to the UPCMM 1 herein can optionally and alternatively apply to the UPCMM 1a, depicted in FIG. 3, the UPCMM 1b, depicted in FIG. 4, or other UPCMMs.

Figure 2B:
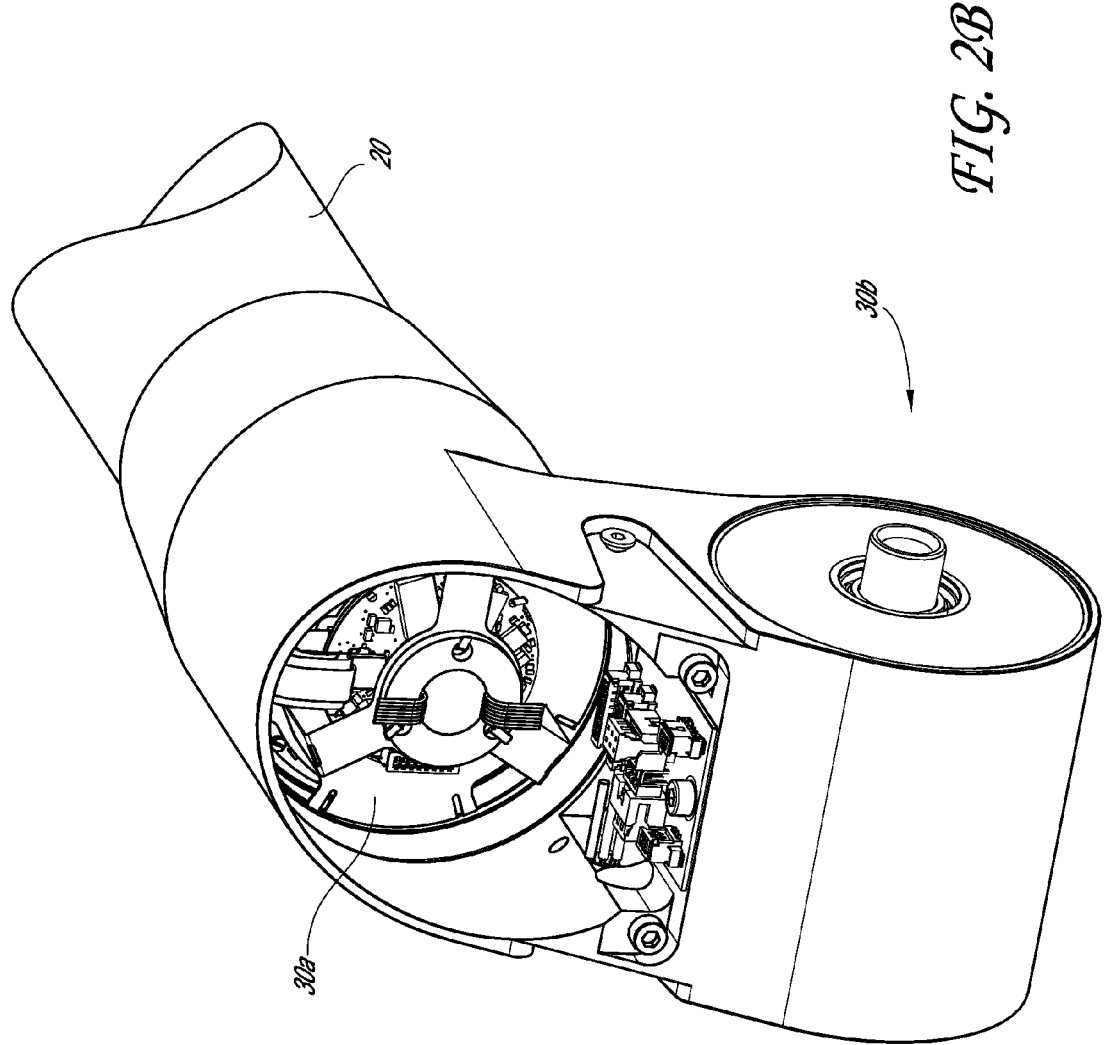
FIG. 2B is a perspective view of a joint assembly from FIG. 2A with a cover removed.

In the embodiment UPCMM 1 illustrated in FIG. 1, the articulation members 30 can be divided into two functional groupings based on their associated motion members' operation, namely: 1) those articulation members 30a which are associated with the swiveling motion associated with a specific and distinct transfer member (hereinafter, "swiveling joints"), and 2) those articulation members 30b which allow a change in the relative angle formed between two adjacent members or between the coordinate acquisition member 30 and its adjacent member (hereinafter, "hinge joints" or "hinges"). Examples of such articulation members 30 in relation to a transfer member 20 are shown in FIGS. 2A-2D. As best shown in FIG. 2A, the transfer member 20 connects to a swiveling joint 30a, which shares a housing with a hinge joint 30b. The cover 32 is shown removed to show the interior of the housing.

More specifically, as shown the UPCMM 1 is substantially symmetrical about the middle transfer member 20a. Each end of the middle transfer member 20a connects by both a swivel joint 30a and a hinge joint 30b to an end of a side transfer member 20b. The opposite end of the side transfer members 20b connect by a swiveling joint 30a and a hinge joint 30b to a coordinate acquisition member 50. While the illustrated embodiment in FIG. 1 includes four swiveling joints 30a and four hinge joints 30b positioned as to create eight axes of movement, it is contemplated that in other embodiments, the number of and location of hinge joints and swiveling joints can be varied to achieve different movement characteristics in a UPCMM. For example, a substantially similar device with six axes of movement could simply lack the swivel joints 30a between the coordinate acquisition members 50 and the side transfer members 20b. As another example, the UPCMM 1a, depicted in FIG. 3, can include 12 axes of rotational movement. In still other embodiments, the swiveling joints 30a and hinge joints 30b can be combined and/or used in different combinations. For example, although the pictures embodiments are substantially symmetric, in other embodiments different numbers of transfer members 20 and/or articulation members 30 can be provided on either side of the device. For example, in some embodiments there may be six axes of movement on one side, and seven axes of movement on the other side (e.g., with an additional axis of movement at a coordinate acquisition member such as a laser scanner).

Figure 2D:
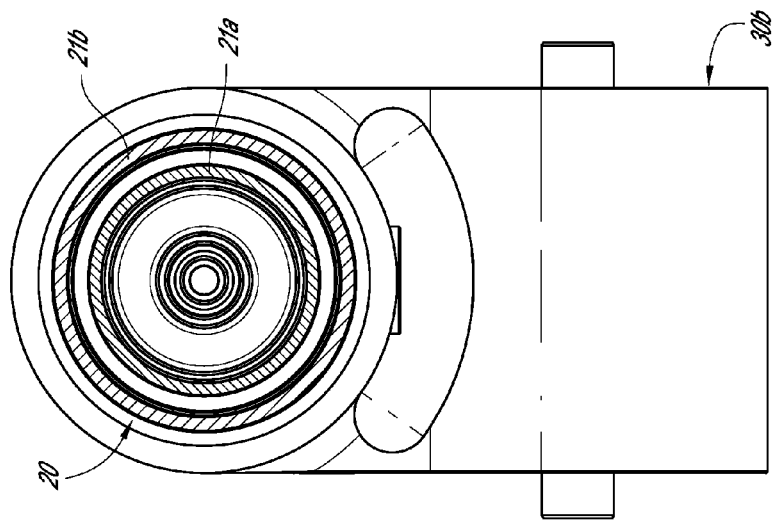
FIG. 2D is a cross-sectional view of the transfer member of FIG. 2A.
Figure 2C:
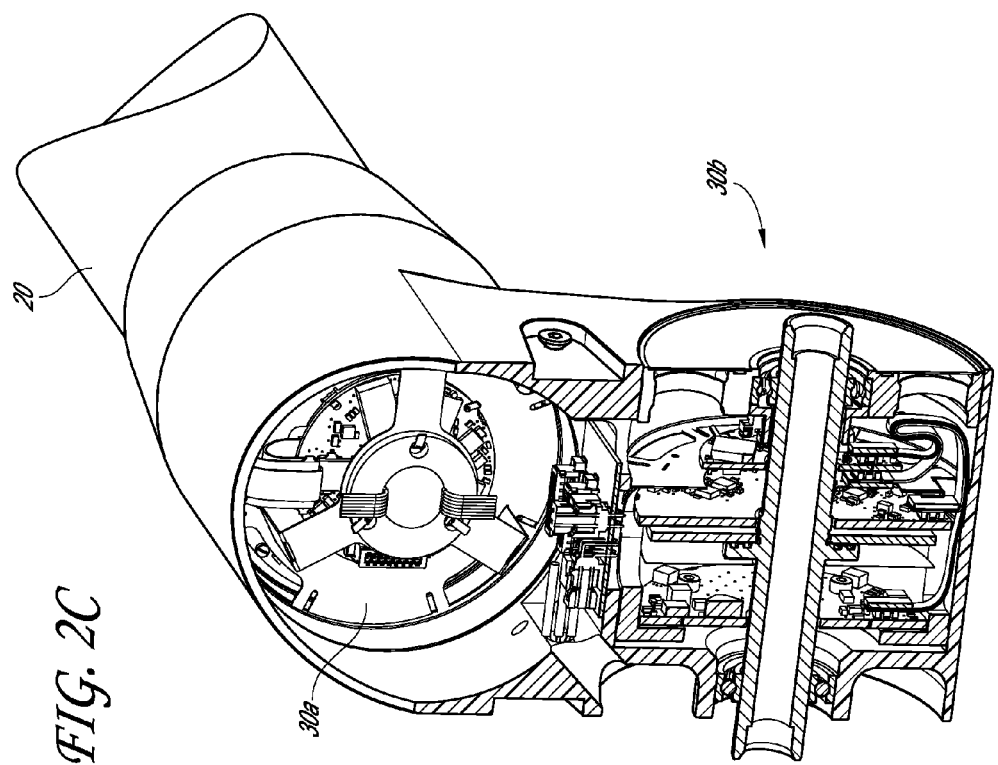
FIG. 2C is a cross-sectional view of the joint assembly of FIG. 2B.

As is known in the art (see e.g., U.S. Pat. Nos. 8,112,896 and 5,829,148, issued on 14 Feb. 2012 and 3 Nov. 1998, respectively, which are hereby incorporated by reference herein) the transfer members 20 can include a pair of dual concentric tubular structures 20a, 20c (as shown in FIG. 2D) having an inner tubular shaft rotatably mounted coaxially within an outer tubular sheath through a first bearing mounted proximately to a first end of the member adjacent and a second bearing located at an opposite end of the member and which can be positioned within, e.g., a dual axis housing. The transfer members 20 operate to transfer motion from one end of the transfer member to the other end of the transfer member. The transfer members 20 are, in turn, connected together with articulation members 30 to form joint assemblies, which can include one or more articulation members.

The hinge joint 30b, in turn, can be formed, in part, by the combination of a yoke extending from one end of a transfer member, and a rotational shaft extending through the articulation members 30b. Both the yoke and the transfer member can then rotate about the rotational shaft to form a hinge or hinge joint 30b.

Each hinge or swiveling joint 30 can have its own dedicated motion transducer in the form of an encoder. Advantageously, both the hinge and swiveling joint encoders can be positioned at least partially, and more preferably, entirely within the dual axis housing within the respective articulation members 30. The encoder is able to sense the rotation of the hinge or swiveling joint to generate one or more sensor signals reflecting the rotation. In one embodiment, the encoder comprises an optical encoder that provides information about the angular position within the hinge or swiveling joint. In other embodiments, other suitable types of sensors may be utilized.

Further, in some embodiments one or more of the transfer members 20 can be telescoping, as depicted in FIG. 10. Thus, for example, the transfer members 20 can include an inner tube 21a mounted within an outer tube 21b such that the tubes can slide longitudinally relative to each other. Sliding between the inner and outer tubes can allow the transfer member's length to be adjustable. Further, a sensor can be included to measure the telescoping position of the transfer member 20 such that the length of the transfer member can be measured. For example, in some embodiments the sensor can be a linear encoder. In the context of the UPCMM 1, the side transfer members 20b can be telescoping. However, in other embodiments the middle transfer member 20a can be telescoping. In further embodiments, all three transfer members 20 can be telescoping. Advantageously, the telescoping transfer members can allow for a greater range of motion of the UPCMM 1. Further, the telescoping transfer members can effectively adjust the size of the UPCMM 1, such that it can be appropriately-sized for smaller and larger users with different arm lengths.

In various embodiments, the coordinate acquisition members 50 can include a contact sensitive member (depicted as a hard probe in FIG. 1) configured to engage the surfaces of a selected object and generate coordinate data on the basis of probe contact, such as a contact probe, an eddy current sensor, an acoustic or Doppler sensor, or a magnet. In other embodiments, the coordinate acquisition members 50 can additionally or alternatively include a non-contact scanning and detection component that does not necessarily require direct contact with the selected object to acquire geometry data. For example, the non-contact scanning device can include a non-contact coordinate detection device (such as a laser coordinate detection device/laser scanner) that may be used to obtain geometry data without direct object contact. The non-contact scanning device can include a camera or other optical device, which functions in conjunction with a laser. It will be appreciated that various coordinate acquisition member configurations including: a contact-sensitive probe, a non-contact scanning device, a laser-scanning device, a probe that uses a strain gauge for contact detection, a probe that uses a pressure sensor for contact detection, a device that uses an infrared beam for positioning, and a probe configured to be electrostatically-responsive may be used for the purposes of coordinate acquisition. Further, in some embodiments, a coordinate acquisition member 50 can include one, two, three, or more than three coordinate acquisition mechanisms.

Further description of certain embodiments of a coordinate acquisition member that can be used with the embodiments described herein can be found in U.S. Pat. Nos. 8,112,896 and 7,908,757, issued 14 Feb. 2012 and 22 Mar. 2011, respectively, which are incorporated by reference herein in their entirety. As depicted in said references, the coordinate acquisition member can include a modular laser scanner that can attach to the main body of the coordinate acquisition member (which can also include a touch probe). The modular features can allow various other coordinate detection devices to be used with the coordinate acquisition member. Additionally, other coordinate acquisition members can be used, as is generally known by those of skill in the art.

Various arrangements of the coordinate acquisition members 50, transfer members 20, and articulation members 30 are shown schematically in FIGS. 11A-11D, further including trackable devices 75, further discussed below. As shown in FIG. 11A, two coordinate acquisition members 50 can be connected at opposite ends, with a plurality of transfer members 20 and articulation members 30 between them. In some embodiments, the transfer members 20 and articulation members 30 can alternate, as shown in FIG. 11B. However, in other embodiments multiple articulation members 30 can be adjacent, such as with a pair of hinge and swivel joints. As shown in FIG. 11C, in some embodiments a trackable device 75 can replace one of the coordinate acquisition members 50, such that one end has a coordinate acquisition member and the other end has the trackable device. Further, as shown in FIG. 11D, in some embodiments the trackable device 75 can be disposed on the transfer members 20 and/or the articulation members 30 (e.g., on a harness).

Additionally, as shown, the UPCMM 1 can include a harness 40 configured to mount to a human. The harness 40 can additionally attach to one or more of the transfer members 20 and/or the articulation members 30. More generally, the harness 40 can attach to the rest of the UPCMM 1 along any of the arm portions. In some embodiments the harness 40 will connect on opposite sides of a middle transfer member 20a. Further, in some embodiments the harness 40 will attach at a center of the UPCMM 1, or on substantially symmetrical locations on opposite sides of a center of the UPCMM. For example, in some embodiments the harness 40 may attach at opposite side members 20b or at opposite sides of the middle transfer member 20a.

As noted, the harness 40 can be configured to mount to a human. As shown in FIG. 1, the harness 40 can include a shoulder strap that can mount around a person's shoulders or neck. The harness 40 can optionally include padding, a widened portion, adjustable straps, additional straps, locking mechanisms, and the like. In some embodiments, the harness 40 can be a backpack. In further embodiments, the harness 40 can be a single strap, such as in the form of an apron or a messenger bag. In other embodiments, the harness 40 can be configured to mount to other portions of a human such as about the hips as a belt or on the head as a helmet (as further described below). In further embodiments, the harness 40 can be configured to mount to both the shoulders and hips of a human. In some embodiments (such as those described below and depicted in FIGS. 18 and 19, the harness 40 can allow the user to support the weight of the UPCMM without using their hands, such that the hands are free to perform other tasks.

Figure 3:
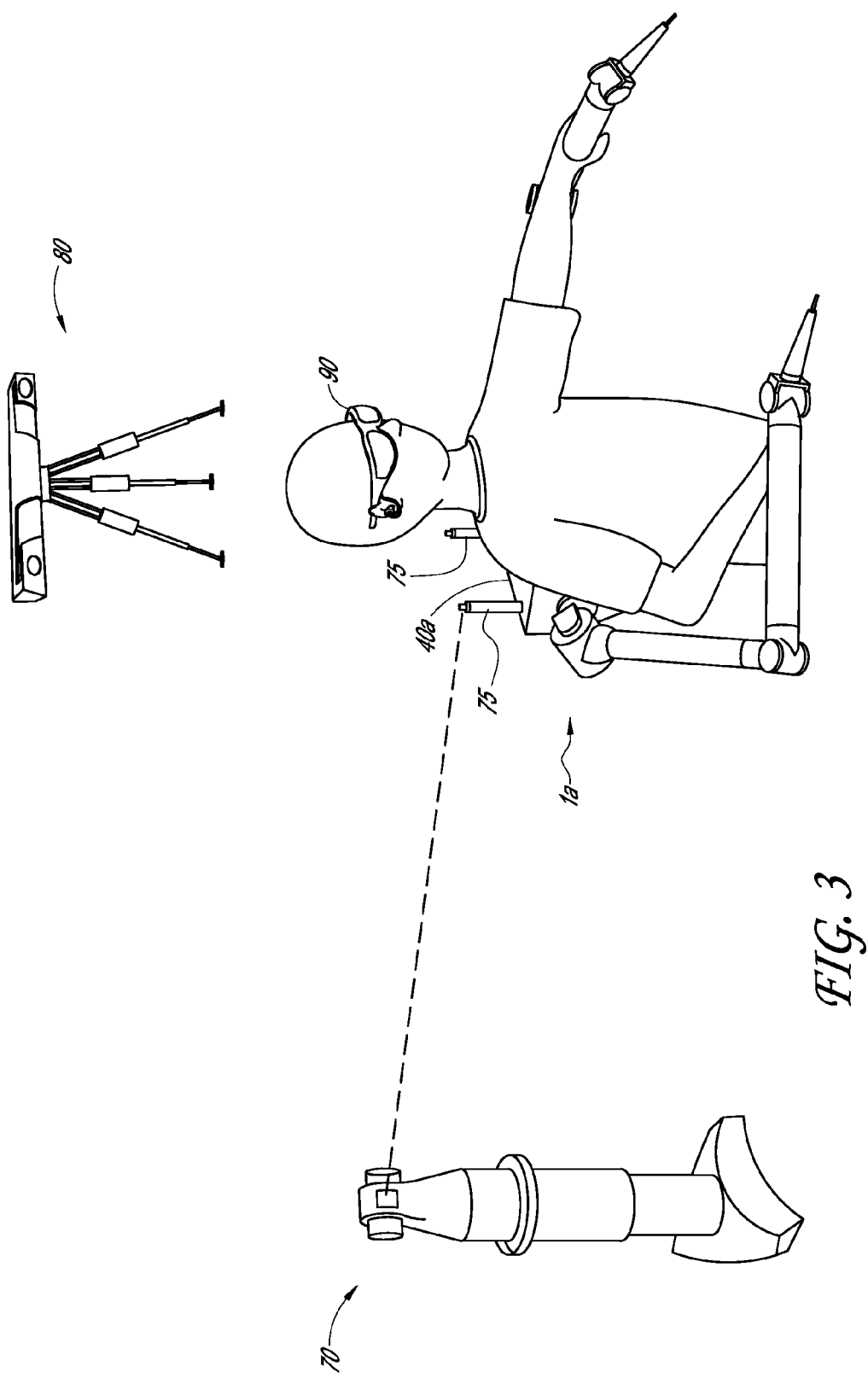
FIG. 3 is a perspective view of a further embodiment ultra-portable articulated arm coordinate measurement machine system.

Embodiments of a backpack-style UPCMM 1a are depicted in FIG. 3. As shown, the UPCMM 1a can include two side transfer members 20b on either side of a backpack harness 40a. The main portion of the backpack harness 40a can thus act as the middle transfer member 20a of the previously described UPCMM 1. The backpack harness 40a can also carry additional electronic features, further discussed below. Yet another embodiment of a backpack-style UPCMM 1b is depicted in FIG. 4. As shown, the UPCMM 1b can include a harness 40b including hooks that mount about a human's shoulders. It will be understood that, unless indicated to the contrary, features described below relating to the harness 40 in FIG. 1 can also optionally or alternatively be applied to the other harnesses disclosed herein.

The harness 40 can attach to at least one of the transfer members 20 and the articulation members 30 to support the weight of the transfer members and the articulation members. For example, in some embodiments the harness 40 can support at least 50%, 75%, or substantially all of the weight of the transfer members 20 and the articulation members 30.

Further, in some embodiments UPCMMs (such as UPCMM 1b, depicted in FIG. 4) can be configured to easily fold together. The UPCMM 1b can then be stored in a carrying case. Notably, because the harness of the UPCMM 1b can be at a substantially central location of the arm (as discussed with respect to each of the embodiments discussed above), the UPCMM will usually not be cantilevered as far as standard PCMMs which extend from a base at the end. Thus, the UPCMM 1b can include transfer members and articulation members with less structural strength, as they do not need to support as much torque. Accordingly, the UPCMM 1b can be made lighter, making it easier to be carried by a user both during use and when in a carrying case. It will be understood that these features can additionally or alternatively be applied to other UPCMMs 1, 1a depicted herein or otherwise.

Figure 12:
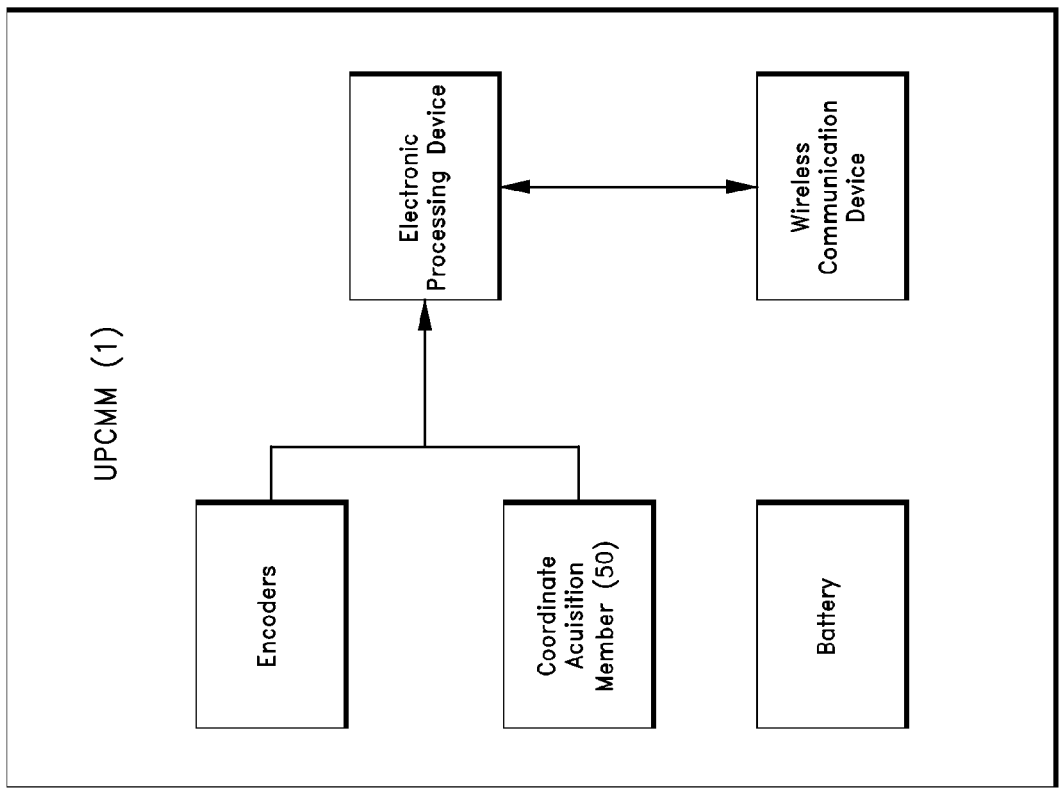

Electronic processing devices such as PC boards containing microprocessors that can serve to manage encoder synchronization, scanner processing, combination of arm and scanner data, and communication with an additional computer, tablet, or display device, can be located inside of the tubular members 21 of the transfer members 20 (as shown schematically in FIG. 12). Alternatively, such electronics could be located external to the tubular members 21 in a housing, or inside or outside of one of the joints 30. In some embodiments it could be preferable to locate the electronics processing devices in the harness 40 which could be a backpack or belt. In some embodiments, locating the electronics in the harness can remove weight and heat from the encoders and other sensors. It is also possible to locate one or more batteries and wireless communication devices in close proximity to the electronics processing devices inside or outside the tubes, joints, or harness, or in an additional embodiment, the battery and wireless devices may be located remotely from the electronics processing devices.

Generally, embodiment UPCMMs 1 can be operated by a human user, who can also optionally carry the UPCMM. The user can move the UPCMM 1 in space to eventually contact or be in close proximity to an object to be measured. During this time, the UPCMM 1 can optionally continuously measure its own position using angular and/or linear encoders. In other embodiments, the UPCMM 1 can only measure its own position when taking a measurement, such as when absolute encoders are used. When a user determines that a measurement should be taken, such a command can be inputted (e.g., by pressing a button, contacting the object, etc.). A trigger signal can then be generated, indicating that a measurement from the encoders at a given time should be recorded. These measurements can then be sent to a processing such as the electronic processing device or external electronics to determine the position of the object or a point on the object, using the measured angular/linear positions of the transfer members 20 and the articulation members 30.

Figure 5:
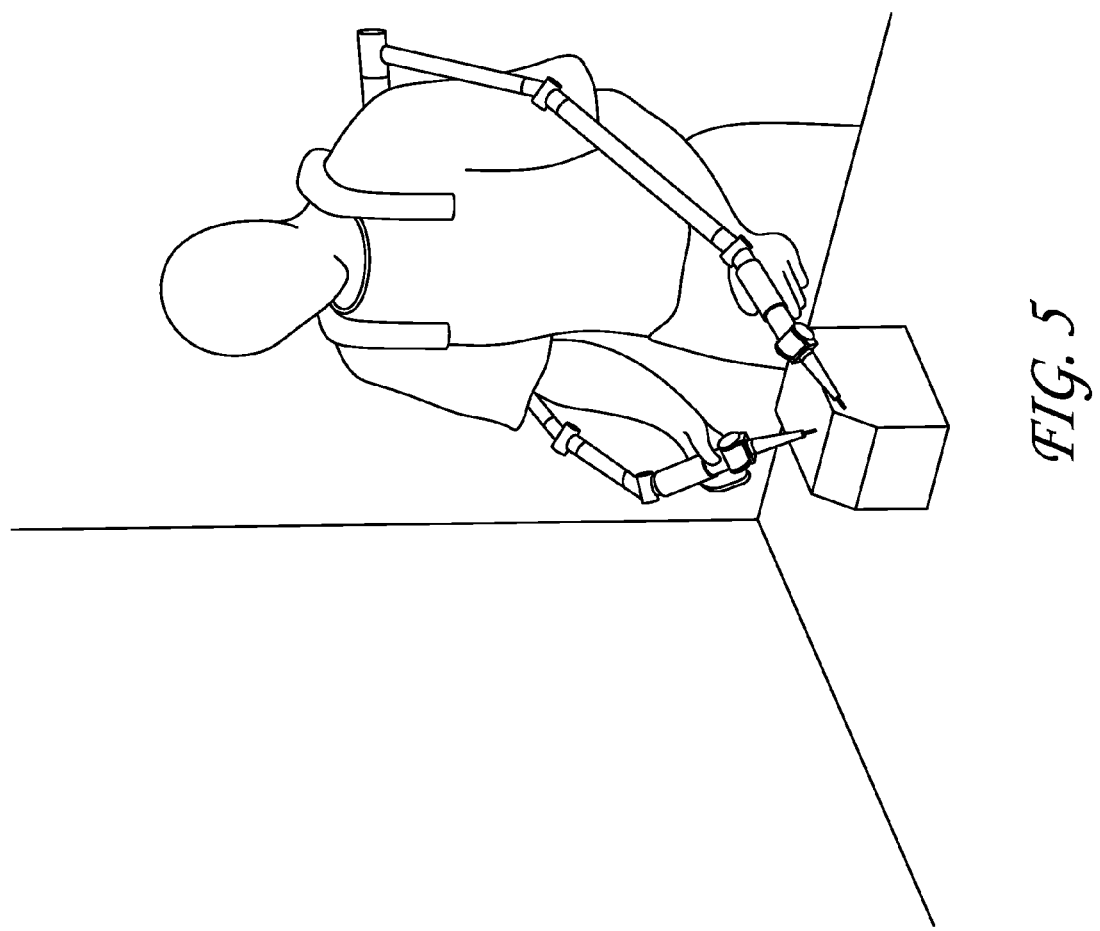
FIG. 5 is a perspective view of the ultra-portable articulated arm coordinate measurement machine used in an embodiment caliper mode.
Figure 6:
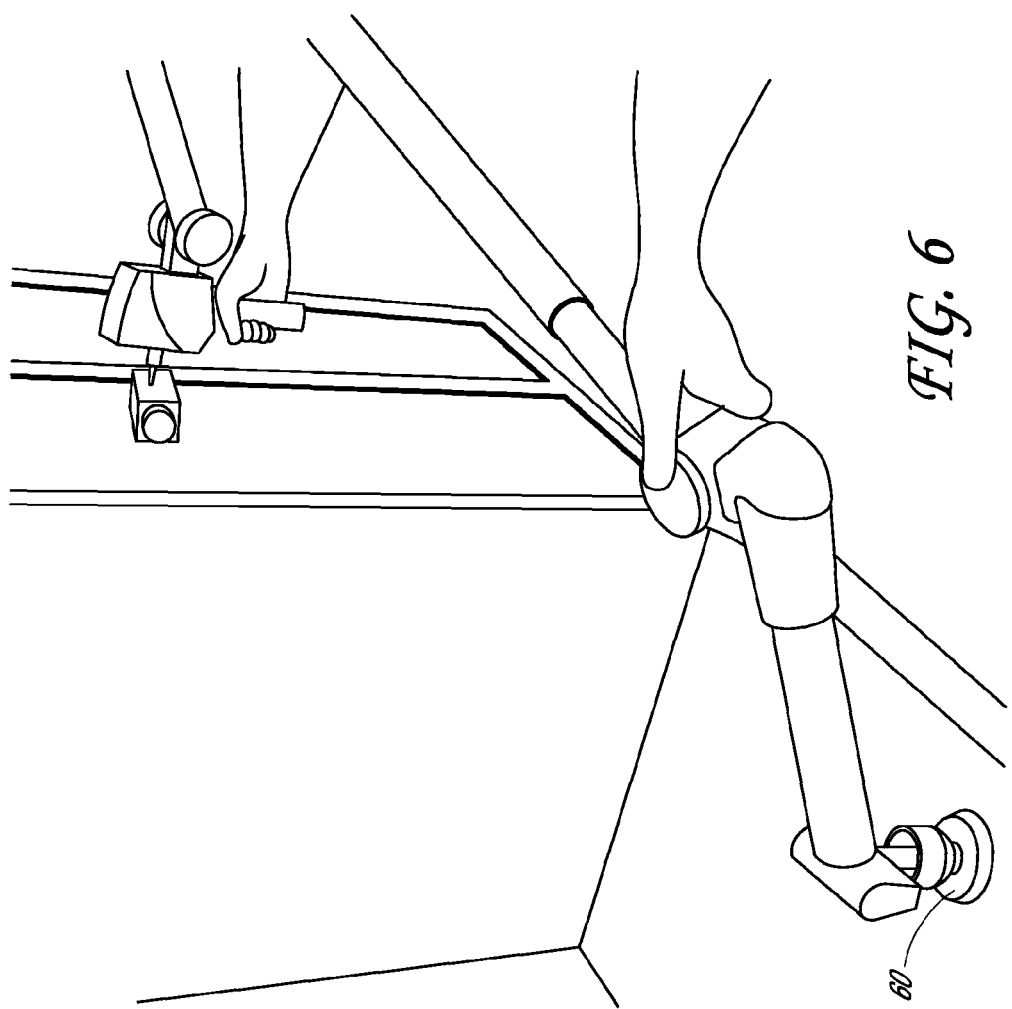
FIG. 6 is a perspective view of the ultra-portable articulated arm coordinate measurement machine used in an embodiment locked mode.

As shown in FIGS. 5 and 6, UPCMMs can be used in a variety of ways different from normal PCMMs. For example, as shown and discussed above, the UPCMM 1 can be significantly more portable, allowing a user to easily take measurements at a variety of locations separated by a distance greater than a maximum measuring length of the UPCMM. The user can simply walk to a new location to be measured, without needing to move a base of a normal PCMM, which may be fastened to the ground or another less moveable or non-moveable surface.

A variety of systems and methods are available to measure an absolute location of the points measured by the UPCMM 1. For example, normal PCMMs intrinsically measure a position of the various transfer members relative to each other, thus generating a position of the coordinate acquisition member relative to a base of the PCMM. Because the base of the PCMM does not move, the measured positions can be in the same coordinate system and thus their positions relative to each other can be known. The location of the base in space can then optionally be measured by other devices or methods (such as those described herein).

As used herein, a "location" or a "location in space" will refer to a location relative to a greater reference frame, such as a geospatial location on Earth or a location in a room. In contrast, as used herein, a "position" or a "position of the UPCMM" will refer to a position of the UPCMM, and its respective transfer members 20, coordinate acquisition members 50, and other components, relative to itself/themselves. Thus, for example, a "position" measured by the UPCMM may refer to the angles of the articulation members 30 and the corresponding measured position of a point measured by a coordinate acquisition member 50 relative to another coordinate acquisition member on the UPCMM. However, if the UPCMM is later moved to a new "location" (e.g., to a location out of reach from its previous location), then a different point could be measured by the UPCMM while in the same "position." Thus, a point could be defined by combining both the "position" and the "location" of the UPCMM. In other words, two unique points can have the same "position" when measured from different "locations."

When desirable, UPCMMs can use other methods to relate the positions of various measured points to each other. Notably, the embodiment UPCMMs discussed above do not include a permanently located base. Thus, measuring the positions of the transfer members relative to each other (and other components of the UPCMM) can yield a position of the coordinate acquisition member at one time, which may not be consistent (or in the same reference frame) as coordinates measured at other times.

Figure 7:
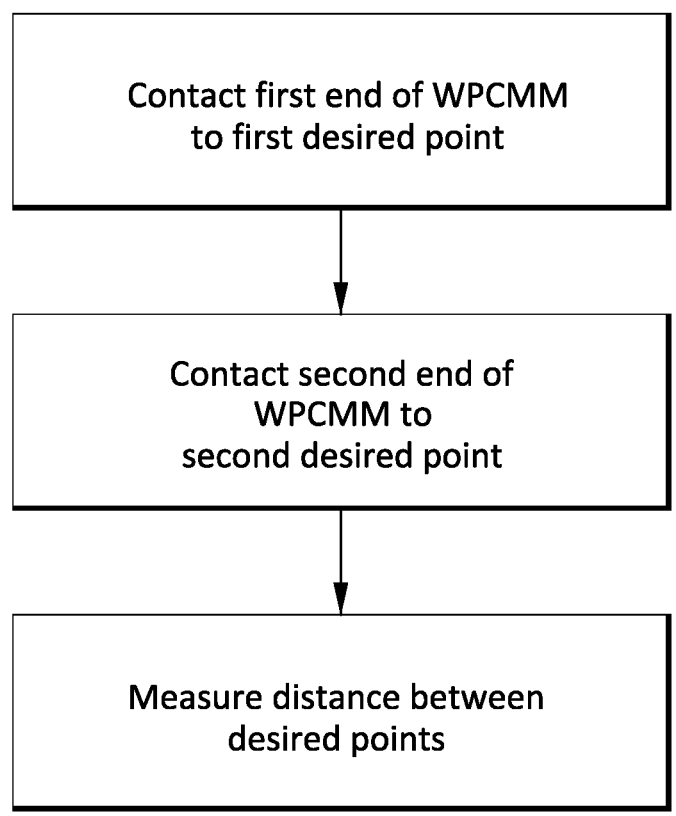
FIG. 7 is a flow chart showing a method to make measurements in a caliper mode.

In one method, consistency between coordinates measured at different times can be ignored. For example, in some embodiments the UPCMM 1 can be used like 3 dimensional calipers, as shown in FIGS. 5 and 7. Thus, for example, the UPCMM 1 can be used to measure the distance between two desired points by placing the two ends of the UPCMM 1 in contact with the two points of interest. A measurement can then be taken, indicating a distance between the two desired points. Even further, if the UPCMM 1 is configured to measure its orientation in space (i.e., its angular position, optionally with respect to gravity), then a distance and angle between the two points (i.e., a vector) can be measured. In some embodiments the UPCMM 1 can include a tilt sensor (or another device measuring orientation relative to the Earth or another reference frame, such as an accelerometer) located within the UPCMM to measure an angular position of the UPCMM in space. In other embodiments, the UPCMM 1 can cooperate with an external system (such as an imaging system, further described below), that can measure an angular position of the UPCMM.

In other contexts, it will be desirable to maintain consistency between coordinates measured from different locations. One method for relating the positions of various measured points of a UPCMM 1 is to provide an effective base for the UPCMM. For example, as shown in FIG. 1, a UPCMM 1 system can include one or more nesting devices 60. As shown in FIG. 1, the nesting devices can generally include a receiving portion 61 and a base portion 62. The receiving portion 61 can be generally cup-shaped, to receive a coordinate acquisition member 50 of the UPCMM 1, such as a contact-sensitive member. Thus, in some embodiments the nesting device 60 can be sized to provide a close and secure fit with the coordinate acquisition member 50. In further embodiments, the coordinate acquisition member 50 can releasably attach to the receiving portion 61 of the nesting device 60, as shown in FIG. 6. For example, in some embodiments the receiving portion 61 of the nesting device 60 and the coordinate acquisition member 50 can use a magnetic force to hold them together. In other embodiments, the coordinate acquisition member 50 can snap into a connection with the receiving portion 61 of the nesting device 60, such as with a releasable locking latch between the coordinate acquisition member and the nesting device 60. Further, in some embodiments fasteners, such as screws, can securely hold the coordinate acquisition member 50 in the receiving portion 61 of the nesting device 60.

The base portion 62 of the nesting device 60 can be configured to rigidly attach the nesting device 60 to a substantially stationary surface. For example, the base portion 62 of the nesting device 60 can include threaded holes or through-holes, or otherwise be configured to receive fasteners that attach the nesting device to a wall, table, floor, or other substantially stationary surface. In further embodiments, the base portion 62 can include a magnetic material such that it can magnetically attach to such surfaces. In even further embodiments, the base portion 62 may include suction devices, latching devices, or any other means for providing a secure connection to the surface. Even further, in some embodiments nesting devices 60 may be formed integrally with larger structures (e.g., a wall, table, floor, or even the object to be measured), such that the entire structure can act as a base portion 62 of the nesting device 60. It will be understood that the attachment between the base portion 62 and the surface, and between the receiving portion 61 and the UPCMM 1 should be substantially secure so as not to introduce additional error to measurements by the UPCMM 1.

Figure 8:
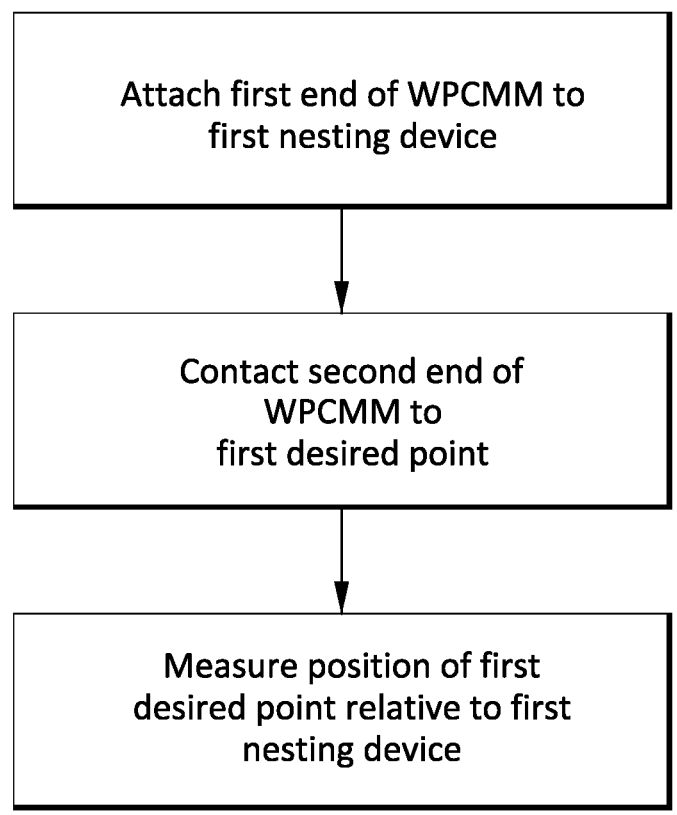
FIG. 8 is a flow chart showing a method to make measurements while connected to a nesting device.

As noted above, the nesting device 60 can act effectively as a base for the UPCMM 1. Thus, when one end of the UPCMM 1 is connected to the nesting device 60, the other end of the UPCMM 1 (and an associated coordinate acquisition member 50) can measure positions relative to the nesting device 60 (i.e., in a reference frame relative to the nesting device). Thus, for example, the UPCMM 1 will be able to measure a distance between a nesting device 60, to which a first end of the UPCMM is attached, and a location measured by the second end of the UPCMM (e.g., by contact with the second end). An example of such a method is depicted in FIGS. 5 and 8. Further, in some embodiments the first end of the UPCMM 1 can be rotationally fixed to the nesting device 60 such that its rotational orientation is held constant. Thus, both the distance and angle between the nesting device 60 and the measured location can be determined. In other embodiments, an angular orientation of the UPCMM 1 relative to the nesting device 60 can be determined by other means such as a tilt sensor or an imaging system, as further described above and below.

Notably, multiple nesting devices 60 can also be used. In some embodiments, the nesting devices 60 can be positioned sufficiently close such that from any one nesting device 60, the UPCMM 1 can reach to at least one other nesting device 60. As long as two or more of these nesting devices are positioned in series, within said distance, one can measure consistent coordinates while attached to any of the nesting devices 60, as indicated by example in the method depicted in FIG. 9.

Thus, for example, one could attach a first end of the UPCMM 1 to a first nesting device and measure a first unique point's position with the second end of the UPCMM, such that the position of the point is known relative to the first nesting device. Then, one could attach the second end of the UPCMM 1 to a second nesting device, and measure the two nesting devices' positions relative to each other. Then, one could detach the first end of the UPCMM 1 from the first nesting device, and measure a second unique point's position, such that the position of the second point is known relative to the second nesting device. Because the position of the two nesting devices relative to each other is also known, the position of the two measured points is also known relative to each other, and relative to both of the nesting devices. Notably, the second measured point may be unreachable by the UPCMM 1 from the first nesting device. Thus, under this method, the reach of the UPCMM 1 can be effectively extended by moving between nesting devices 60. It will be understood that in some embodiments more than two nesting devices 60 can be used to extend the range of the UPCMM 1 even further.

In embodiments without nesting devices 60, or where nesting devices 60 are not available within range of all points that one would like to measure, other methods and systems can be used to relate coordinates measured by the UPCMM 1. For example, in some embodiments the location of the UPCMM 1 can be measured relative to another reference frame. For example, in some embodiments the UPCMM 1 can be associated with a laser tracker. Examples of such laser trackers are depicted in FIG. 3 and further disclosed in U.S. Patent Application No. 2012/0105821, published 3 May 2012, which is incorporated by reference herein. As shown, the laser tracker 70 can be positioned to track a position on the UPCMM 1 relative to the stationary laser tracker. In some embodiments, the UPCMM 1 can optionally include a trackable device 75 on the harness 40, or in more specific embodiments on a backpack portion of the UPCMM. In some embodiments the trackable devices 75 can be located along portions of the transfer members 20, the tubes 21, at the joints 30, or at one or both of the coordinate acquisition members 50. In some embodiments the UPCMM 1 can be tracked from one end of the UPCMM and measurements can be taken with the other end of the UPCMM using the coordinate acquisition members 50 at the other end. For example, one end can include a trackable device 75 and the other end can include one or more coordinate acquisition members 50. In some embodiments, the trackable device 75 can be a retroreflector or another reflective device easily detected by the laser tracker 70. Further, in some embodiments multiple trackable devices 75 can be included on the UPCMM 1, improving the accuracy of the measured location and orientation of the UPCMM. One preferred embodiment can include one or more retroflectors and a series of LED's or markers that can be seen by the tracking device. Even further, in some embodiments the disposition of the laser tracker 70 and the trackable devices 75 can be reversed, such that the tracker 70 is mounted on the UPCMM 1 and the trackable devices 75 are at a fixed location. It will be understood that other tracking systems can be used, that are not necessarily limited to lasers. For example, in some embodiments a global positioning system (GPS) can be used. Further, in some embodiments a localized version of GPS can be used, including local signal emitters at known local positions (such as inside a single building) in communication with a GPS receiver that can serve as a trackable device 75.

For example, in further embodiments an optical tracker 80 can be used to track a position and orientation of the UPCMM 1. Examples of such optical trackers are depicted in FIG. 3 and further disclosed in U.S. Pat. No. 7,945,311, issued 17 May 2011, which is incorporated by reference herein. The optical tracker 80 can capture one or more images of the UPCMM 1 and use those images to measure a location of the UPCMM relative to the optical tracker 80. As shown, the optical tracker 80 can optionally include two side-by-side cameras to create a stereoscopic measurement. However, in other embodiments more cameras can be used. Further, in some embodiments the cameras can be positioned independently. For example, in some embodiments the cameras can be mounted at different locations in a room. Further, in some embodiments, three or more than three cameras can be used. Similar to embodiments with the laser tracker 70, discussed above, the UPCMM 1 can optionally include trackable devices 75 that can facilitate recognition by the optical tracker 80. Additionally, in some embodiments the optical tracker 80 can be mounted on the UPCMM 1, as described with the laser tracker 70.

Again, it will be understood that other tracking systems can be used. For example, some trackers can operate using signals other than visible light, such as other portions of the electromagnetic spectrum. Further, in some embodiments the position and orientation of the UPCMM 1 can be determined with multiple sensors detecting its position (or the position of multiple trackable devices) by triangulation. In further embodiments the tracking can be done by a series of cameras that track markers on the UPCMM 1. Even further, in some embodiments the location of the UPCMM 1 can be tracked using indoor global positioning systems (GPS).

Figure 13:
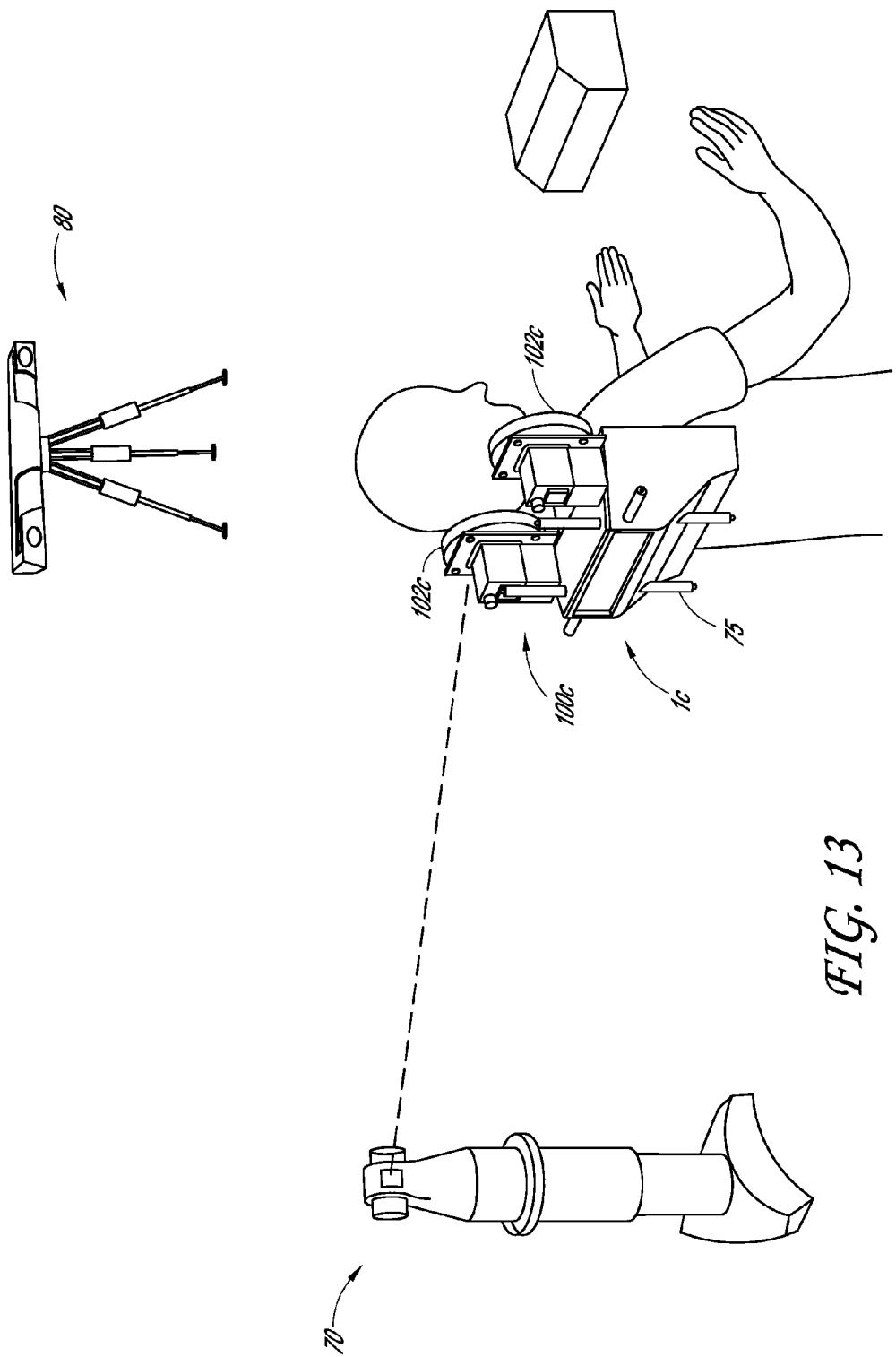
FIG. 13 is a perspective view of a further embodiment ultra-portable coordinate measurement machine system.
Figure 14:
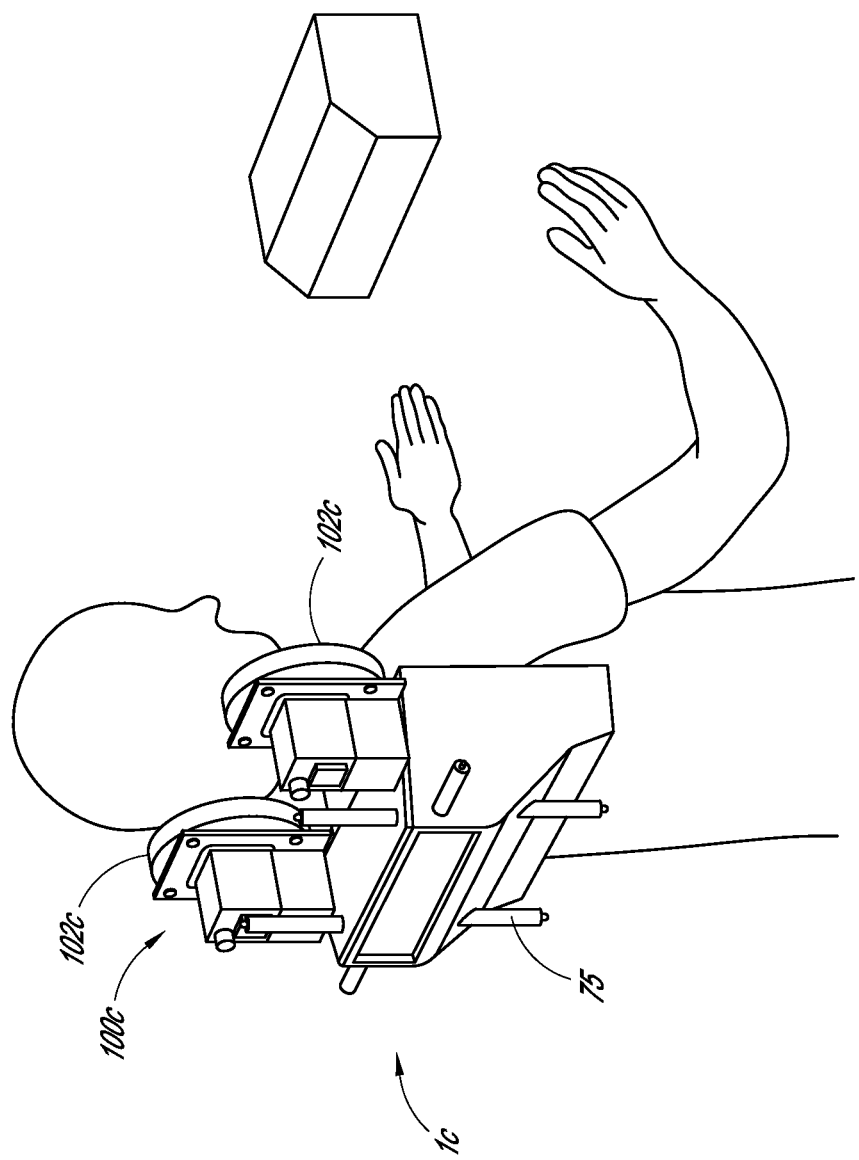
FIG. 14 is a perspective view of an ultra-portable coordinate measurement machine similar to that in FIG. 13.
Figure 15:
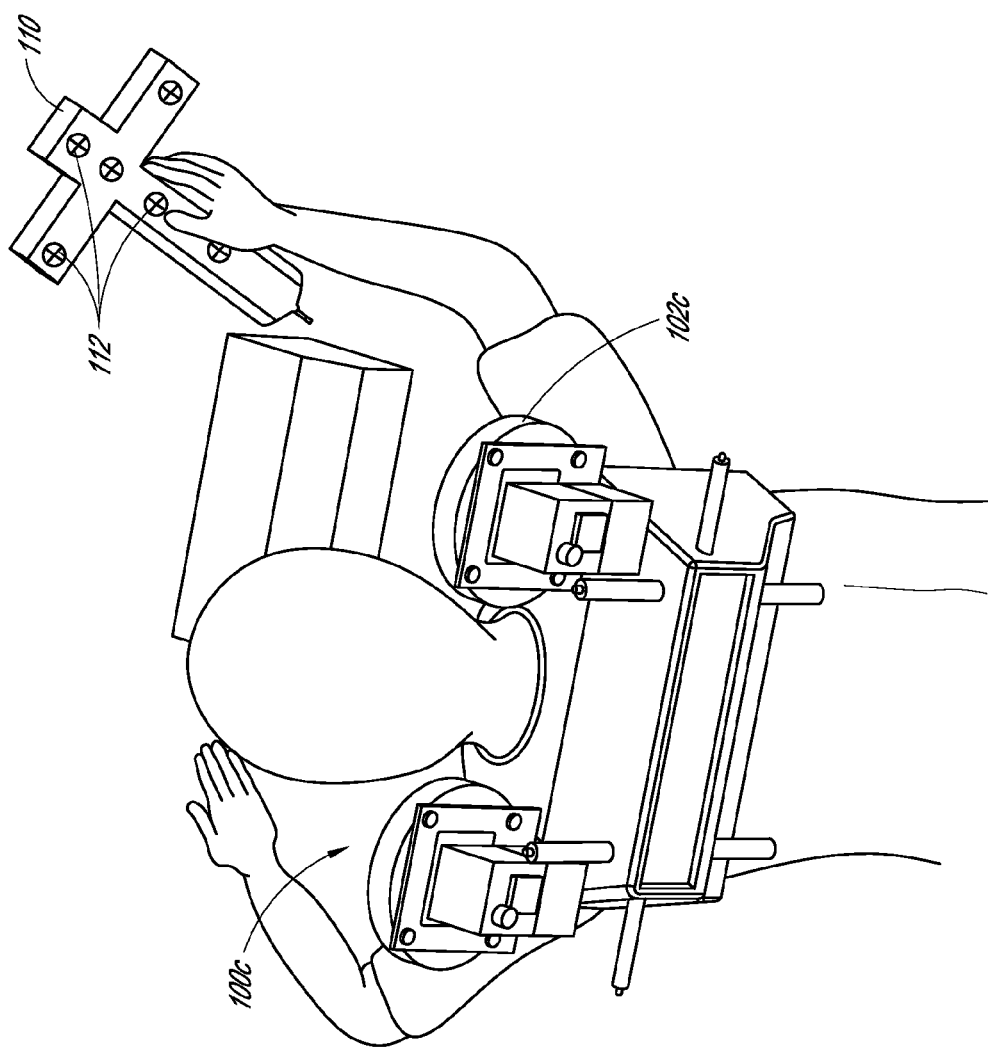
FIG. 15 is a perspective view of the ultra-portable coordinate measurement machine with a probe.

Similarly, other measuring systems can be used to measure the position of coordinates relative to a UPCMM. For example, in some embodiments optical measuring devices can be used to measure coordinates relative to the UPCMM in a manner similar to the arm components (such as the transfer members and articulation members). One example is depicted in FIGS. 13 and 14. As shown, the UPCMM 1c can include an optical coordinate acquisition member 100c mounted to the harness 40c in the form of a backpack. However, it will be understood that other harnesses or other structures for mounting to a user can be used, for example as those described herein. The UPCMM 1c depicted in FIGS. 13 and 14 can be tracked in space using similar methods and systems as those described above, such as in FIG. 3.

The UPCMM 1c in FIGS. 13 and 14 includes an optical coordinate acquisition member 100c in the form of one or more cameras 102c, configured to receive visible light, infrared light, or other portions of the electromagnetic spectrum. As shown, two cameras 102c can be provided to form a stereo vision system mounted directly to the harness. The stereo vision system 100c can take images of an object to be measured. Because the cameras 102c can be held in a known position and orientation relative to the harness (such as a fixed position and orientation), the position of the object to be measured can be estimated by comparing the two images using stereo vision techniques.

Figure 16:
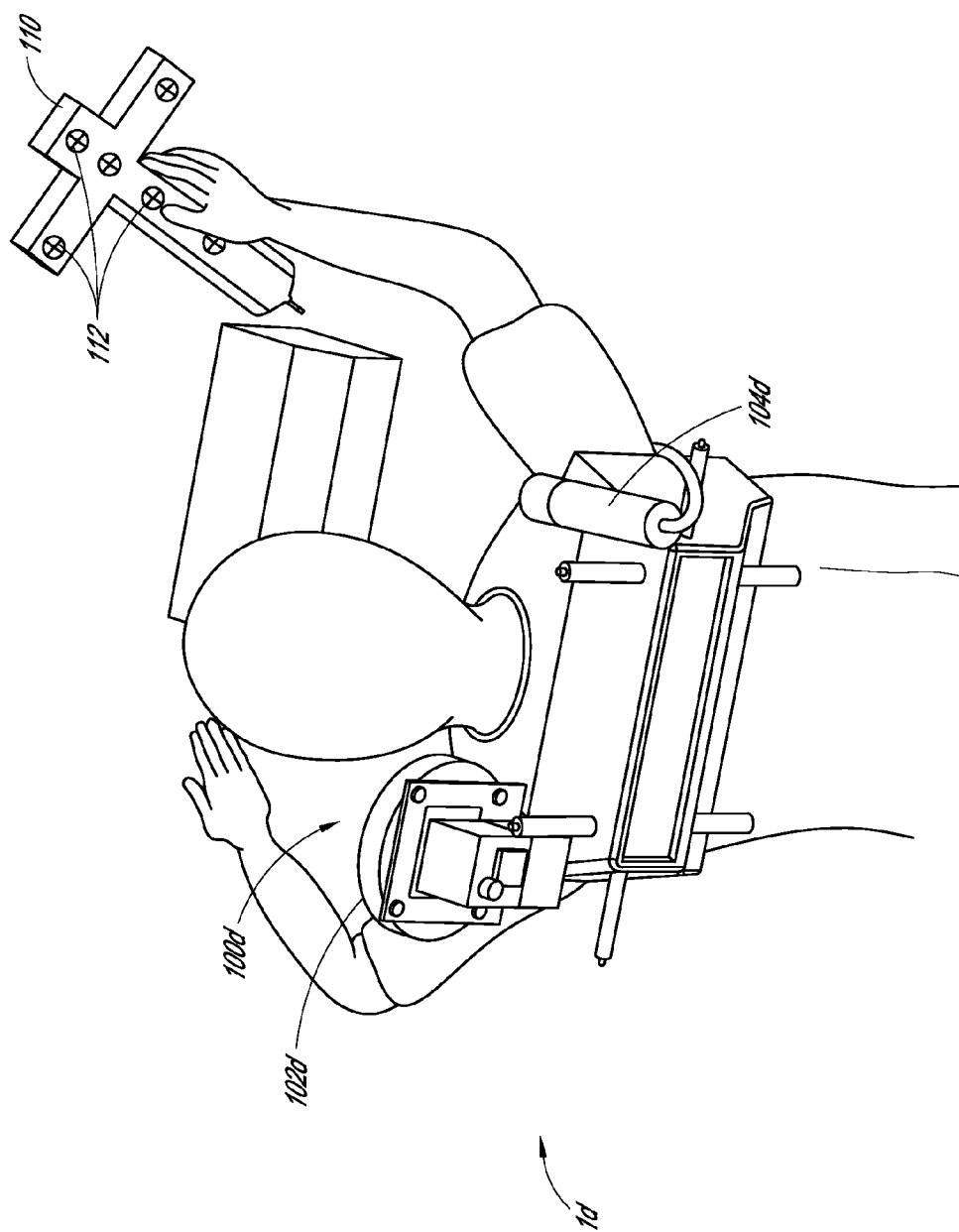
FIG. 16 is a perspective view of another embodiment ultra-portable coordinate measurement machine with a probe.
Figure 17:
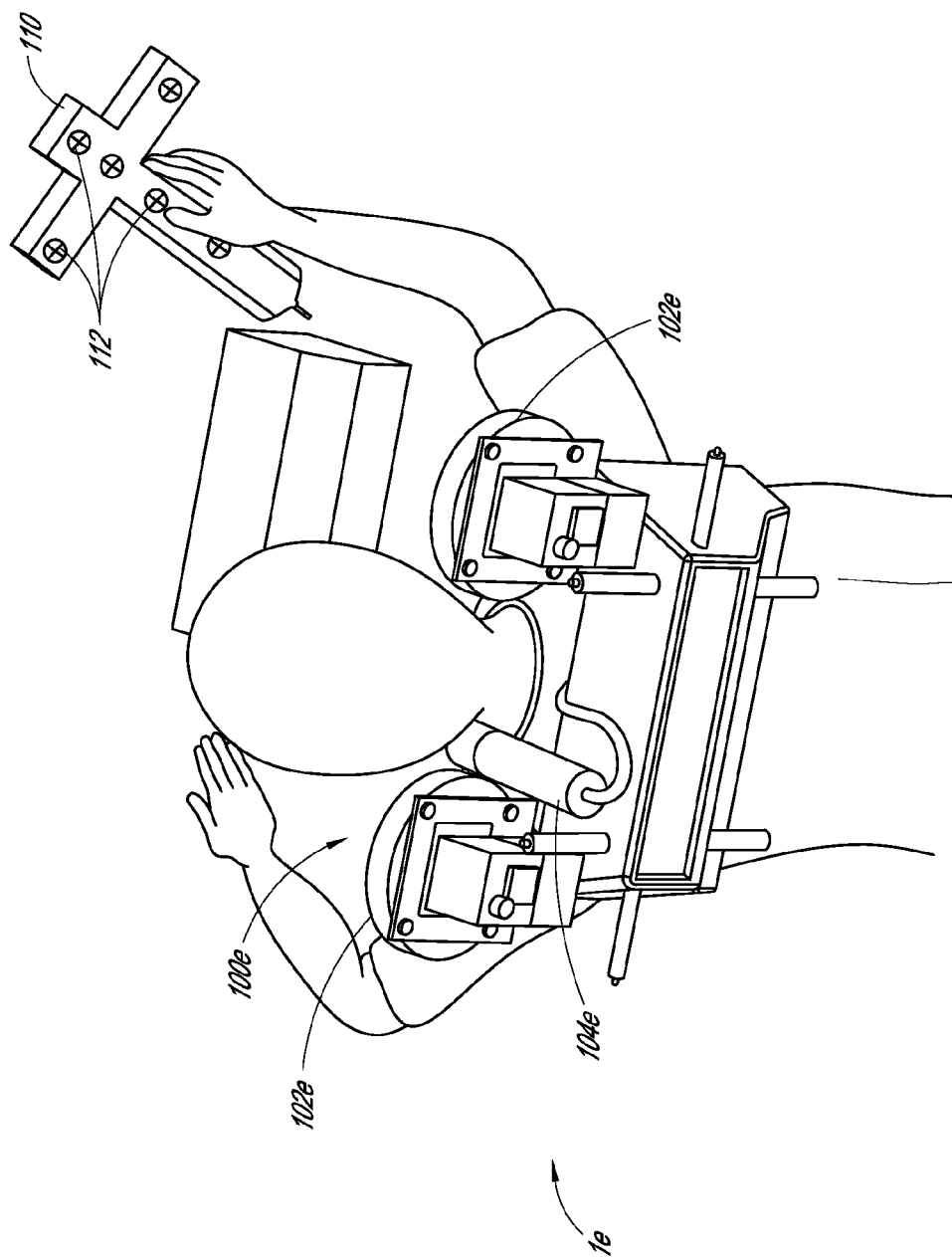
FIG. 17 is a perspective view of another embodiment ultra-portable coordinate measurement machine with a probe.

Further, in some embodiments the optical coordinate acquisition member 100d, 100e can include a stereo vision system including a light projector 104d, 104e, such as a structured light projector or a regular (unstructured) light projector, as shown in FIGS. 16 and 17. FIG. 16 includes an optical coordinate acquisition member 100d with one camera 102d and FIG. 17 includes an optical coordinate acquisition member 100e with two cameras 102e. The structured light projector 104d, 104e can be configured to project a structured light pattern on an object to be measured, facilitating point detection by one or more cameras on the optical coordinate acquisition member. The light pattern can have two dimensional characteristics that can create identifiable features or texture on the object that facilitates identification of similar features by the camera(s). Notably, although the projector 104d, 104e is depicted as being mounted with the cameras 102d, 102e, in some embodiments the projector can be mounted independently (such as on a tripod, not connected to the harness). However, in embodiments with only one camera 102d, it may be preferable to keep the projector 104d and the camera in a fixed or otherwise known relative position and orientation. The projector 104d, 104e can be configured to produce various structured or unstructured patterns that aid in the correlation of pixels from one camera to the other. Some commonly used patterns are random dots, random squares, fixed dots, fixed squares, checkerboard, grids, lines, alternating grey scale sinusoidal patterns commonly used in phase shift. Other patterns can likewise be employed as well as combinations of different patterns and alternating between different patterns.

The cameras and projectors can optionally be configured to tilt and pan, such that they can be oriented in different directions to view different areas relative to the user wearing the UPCMM. Thus, for example, if a user expects to be measuring objects on a ceiling or floor, the cameras and projectors can be aimed upward or downward. Further, in some embodiments the cameras and projectors can be configured to pan and tilt automatically, such that the user can command them to move accordingly. Encoders could be used to track the movement of the cameras and thus correlate any angular change relative to other parts of the UPCMM, such as the harness, whose location is tracked as described herein.

The cameras used with the optical coordinate acquisition members can be high resolution cameras such as the Blackfly model available from Point Grey. The projectors used with the optical coordinate acquisition members can be LED or laser light source lasers. Further, an optical mask can be used to produce a random or regular pattern to form the structured light (such as a texture) on the object. Examples include the EFFI-Lase from Effilux. The projector can also be a DLP projector such as the Lightcrafter from Texas Instruments. Such projectors can potentially project a variety of different patterns, as well as additional information to the user, as further discussed herein.

Notably, the optical coordinate acquisition members can measure a plurality of positions simultaneously. Further, these measurements can be made continuously as the UPCMM moves through the environment. In some embodiments, the UPCMM can be configured to take measurements continuously at a desired frequency, such that three-dimensional measurements of the environment can be generated substantially in real-time. Alternatively, the UPCMM can be configured to take measurements at specific times, for example as commanded by the user. In some embodiments, these commands can be provided according to the movement of the UPCMM in space, as further described below.

Figure 9:
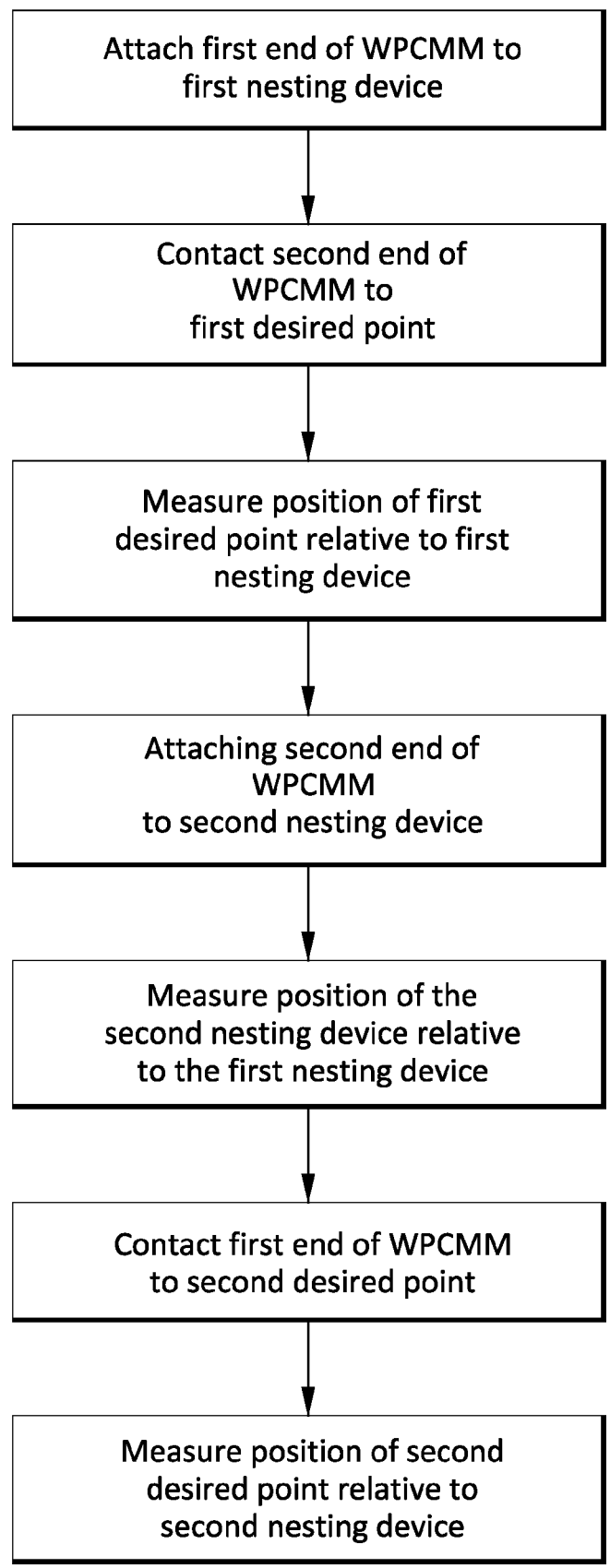
FIG. 9 is a flow chart showing a method to make multiple measurements beyond the range of a standard coordinate measuring machine.

The optical coordinate acquisition member's ability to measure a plurality of positions simultaneously can also be used to associate positions measured at different times in a manner similar to that in FIG. 9. As described in FIG. 9, the arm features can associate coordinates of two nesting devices, such that positions measured at different times can be associated. Similarly, overlapping points measured by the cameras in two different images can be used to associate the coordinate systems of each image, such that non-overlapping points measured in the images can be associated with a single coordinate system. Thus, the location of the UPCMM can optionally be tracked in space without external tracking devices. In some embodiments, it may be desirable to include fixed markers in the environment, such as identifiable markers 120f (depicted in FIG. 19). These fixed markers 120f can be fixed to a space, an object, or can be projected onto the same to provide a constant position that can be easily identified by the camera to associate coordinate systems in multiple images. Thus, the fixed markers 120f can serve a purpose similar to the nesting devices 60 described above.

Further, the optical coordinate acquisition member can be used along with a probe 110. As shown in FIGS. 15-19, the probe 110 can be held by the user and be disconnected from the rest of the UPCMM. The probe 110 can include a plurality of identifiable markers 112 that can be imaged by cameras 102 on the UPCMM. The cameras 102 can then determine a position of the identifiable markers 112, and use that to determine a position and orientation of the probe 110 relative to the UPCMM. Thus, the position of the probe tip 114 can also be determined, such that specific points can be measured when in contact with the probe tip. The identifiable markers 112 can be LEDs, retroreflectors, or include identifiable colors or patterns that can be recognized by the cameras 102. Further, they can be distributed such that 3 or more of the identifiable markers 112 can be seen by the cameras 102 at one time in substantially all positions of the probe 110 during use. The probe can be configured with a variety of contact tips such as a ball, point or touch trigger probe. It could also be in the form of a non-contact probe such as a laser line scanner or area scanner.

Further, in some embodiments multiple probes 110 can be used. In such situations, it may be desirable for each probe 110 to include distinguishable markers 112, such as including different colors or patterns. Probe-like features can also be used, such as an absolute scale indicating known dimensions such as a known distance or angle. The absolute scale can, for example, include two identifiable markers a known distance apart, or three identifiable markers defining a known angle. The markers on the absolute scale can then be used to calibrate the optical coordinate acquisition member or enhance the scaling and position of the optical system.

Even further, in some embodiments the probe 110 can be in the form of a glove. In such embodiments, the user could optionally use their hand to move the object to be measured while also measuring it. In such situations, identifiable markers can optionally be fixed to the object such that it can be tracked while being moved.

Further, in some embodiments the probes 110 described herein can serve as a remote control for the UPCMM. For example, the probe 110 can include one or more buttons, knobs, or other actuatable devices that can allow the user to input commands. The probe 110 can include a communications module that can send these commands to a main portion of the UPCMM (such as the harness), indicating commands such as to take a measurement, change a measuring frequency, change a power setting of the device, or other commands. Further, in some embodiments the probe 110 can have a pistol grip.

Figure 18:
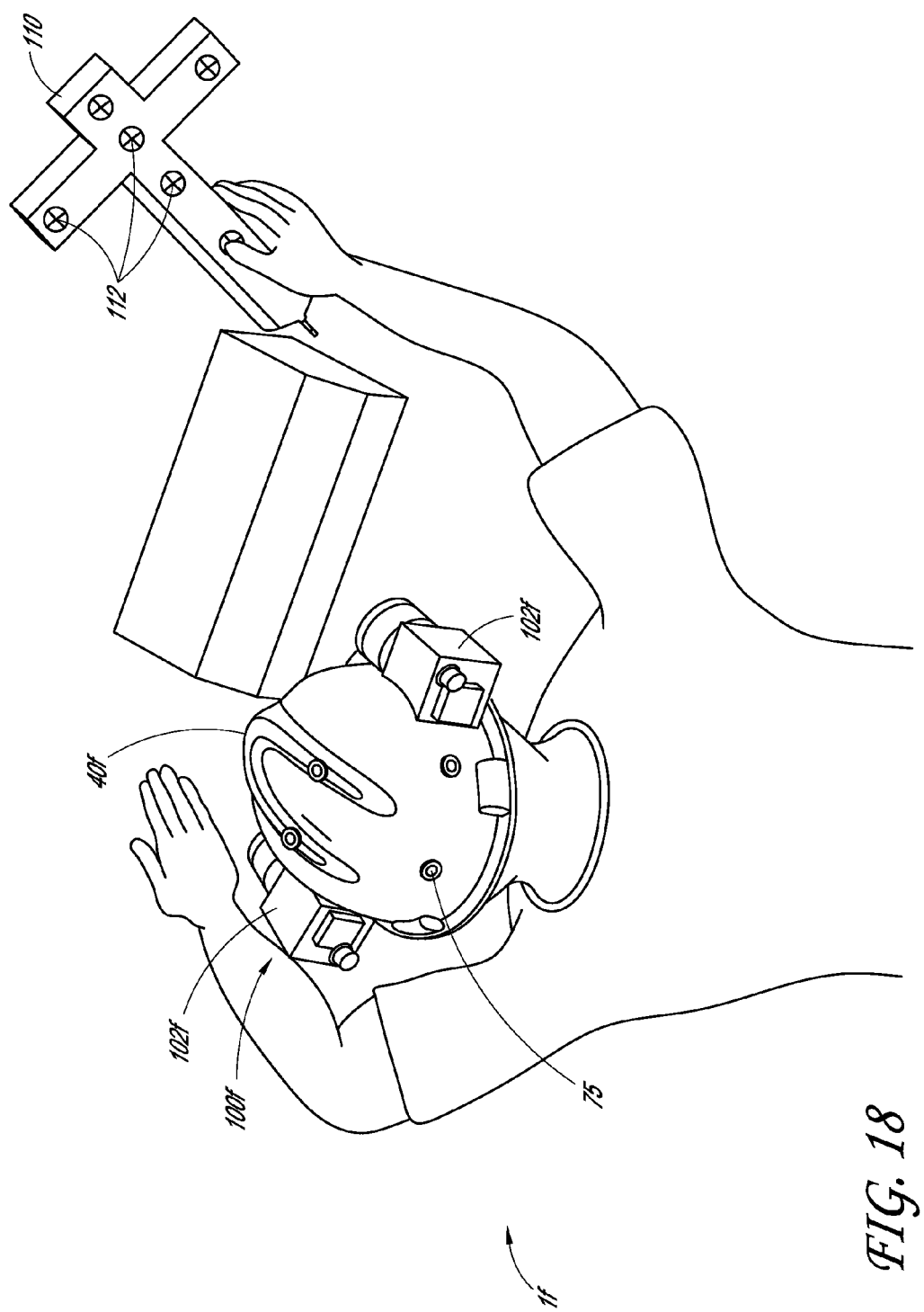
FIG. 18 is a perspective view of another embodiment ultra-portable coordinate measurement machine with a probe.
Figure 19:
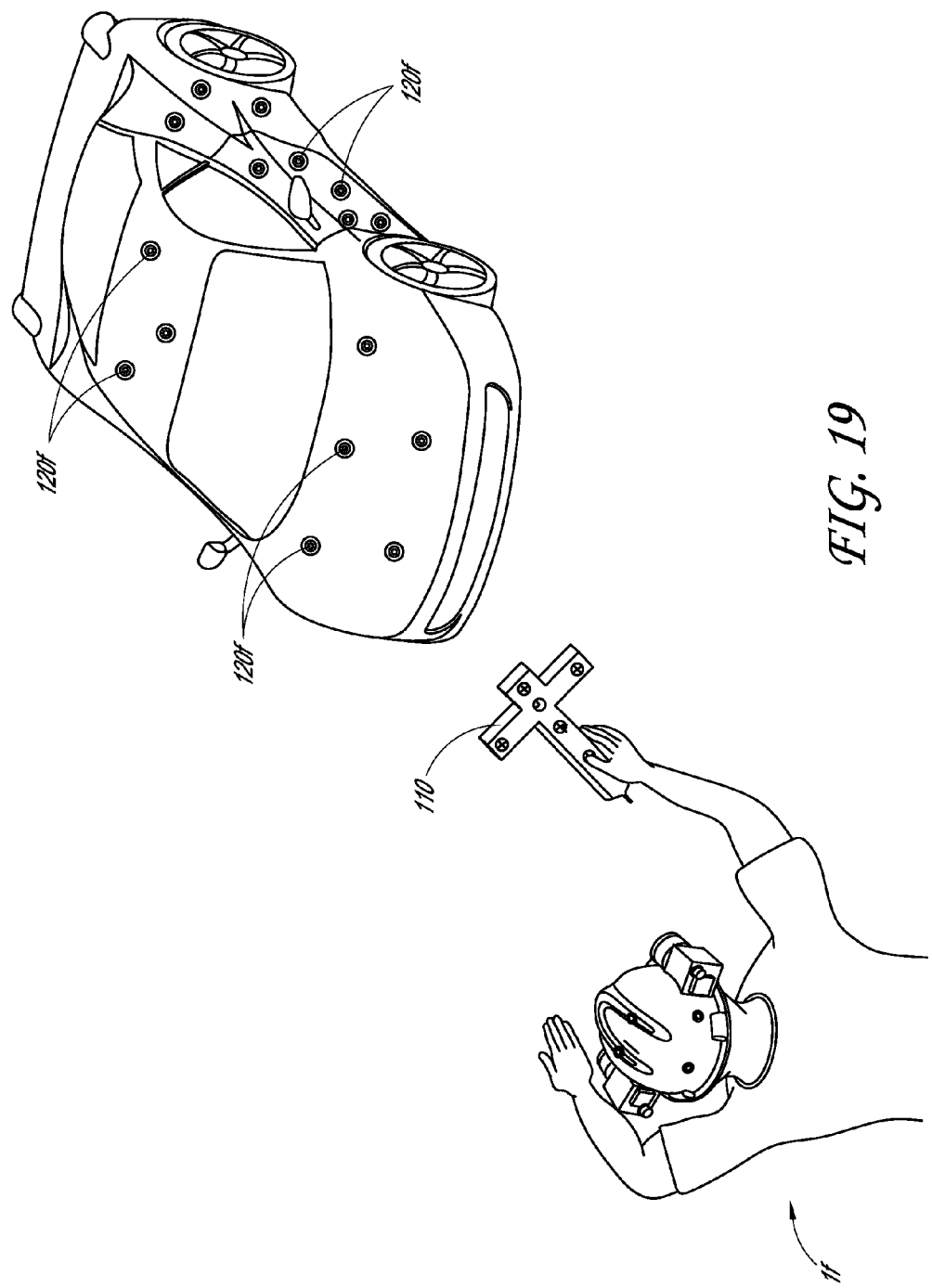
FIG. 19 is a perspective view of another embodiment ultra-portable coordinate measurement machine system with a probe.

As shown in FIGS. 18 and 19, and briefly described above, the UPCMM 1f can optionally be worn by the user with the harness 40f in the form of a helmet. Notably, the harness 40f can be more effective as a helmet when the UPCMM 1f has a lighter weight, such as when using an optical coordinate acquisition member 100f instead of larger and/or heavier arm features. The helmet 40f can also optionally be combined with a backpack-styled harness or other harness to remove weight from the helmet. For example, the backpack harness can include a battery module, computer processing modules, or other features that can be connected to the cameras 102f (and an optional projector) but need not be mounted in a known geometric relationship to the cameras. Cameras 102f can be mounted on the helmet 40f and oriented such that the cameras image an area viewed by the user. Further, as shown, the helmet 40f can include trackable devices 75 that can facilitate measuring the location of the UPCMM 1f.

Additionally or alternatively, in some embodiments the UPCMM 1 can be used with a heads-up-display ("HUD") 90. Because the UPCMM 1 can be particularly portable, it is less likely that a user will be near a computer monitor or other visual output device during use. Thus, a portable display may be advantageous. As shown in FIG. 3, the user can wear a portable display 90 that provides a visual display to the user. As shown, the portable display 90 can be a HUD in the form of glasses. The glasses can include a projector or other display mechanism that the user can see during operation. In some embodiments, a processor on the main body of the UPCMM 1 (such as a processor located on the harness 40, inside or outside the transfer members 20 or tubes 21, or inside or outside the joints 30) can communicate by wire or wirelessly with the portable display 90 to control what is displayed. Thus, for example, the HUD can provide information such as what points have been measured, remaining battery life, a measuring mode of the UPCMM 1, areas that have not been measured, discrepancies between measured points and expected coordinates (for example, from a CAD file or building plan), project into the environment features or objects not actually present in the environment, other augmented reality features, and the like. The HUD 90 can be particularly advantageous when used with a helmet-style harness holding the cameras, as described herein. More generally, when the cameras of an optical coordinate acquisition member 100 closely match the field of view of the user, the HUD 90 can show the user measured coordinates (or other associated data derived from the measured coordinates) substantially in real-time.

Similarly, in some embodiments the projectors 104 described herein can be used to provide data similar to that provided by the HUD. Notably, this data can be projected directly on the environment and objects to be measured, such that individuals other than the user can see the projected information.

Additionally or alternatively, in some embodiments the UPCMM 1 can be at least partially controlled by motion of the arm itself. Because the UPCMM 1 may be more portable than usual PCMMs, a user of a UPCMM may be far from a computer or other command-input device in communication with the PCMM. Thus, additional command-input options may be desirable. For example, whereas some commands or instructions may be triggered by the pressing of a button, pulling a lever, turning a dial, or actuating some other traditional actuation device in some embodiments, in other embodiments the same or different instruction can be triggered by a specific motion or position of the UPCMM 1, which can be detected by the encoders and other sensors in the UPCMM. For example, in some embodiments the arm can enter into different data acquisition modes depending on its speed of movement. An operator of the UPCMM 1 may move the UPCMM slowly when a critical point will soon be measured. Thus, the UPCMM 1 can increase its measurement frequency, accuracy, or other characteristics when the arm is moving slowly. Additionally, the UPCMM 1 can be toggled between a mode where the arm is used as a computer mouse and a measurement mode with a quick movement of one of the last axes.

Further, in some embodiments the location of the UPCMM 1 in space can be used to input commands to the UPCMM 1. For example, when used with a tracking device such as the laser or optical trackers 70, 80, the UPCMM 1 may enter a low-power or sleep mode when near the trackers, or another designated area. While near the trackers or the other designated area, the operator may be at a computer or desk far from the object(s) to be measured. Thus, the UPCMM 1 can reduce its power consumption while not measuring the object. Similarly, in some embodiments the UPCMM 1 can enter a low power or sleep mode in response to a certain position, such as an arms-folded position. In some embodiments the UPCMM 1 can reenter an awake mode or normal measuring mode when it is located further away from the trackers. In other embodiments, the awake or normal measuring mode can be triggered by a position of the UPCMM 1 such as an arms-wide-open position. Similarly, commands can be entered with an optical coordinate acquisition member instead of an arm. For example, a measurement can be taken if the user holds the cameras in a specific position for an extended period of time, or measurement frequency and/or accuracy can be increased when the cameras are moved slowly. Further details regarding alternative methods of data entry can be found in U.S. Pat. No. 8,112,896, issued 14 Feb. 2012, which is incorporated by reference herein.

As with the previous embodiments, it should be appreciated that these features related to control of the arm can be used in other types of CMMs and need not be used in combination with the additional embodiments described above and below the preceding section.

In further embodiments, the harness 40 can provide for a wide variety of functionality. For example, as discussed above, the harness 40 can include trackable devices 75 and can serve as a middle transfer member 20a. Additionally, in some embodiments the harness 40 can include a processor configured to receive signals from the encoders associated with the articulation members and process them for a variety of purposes. In some embodiments, the data from the encoders can be stored on a memory within the harness 40. In further embodiments, the data can be transmitted to an external computer or processor by wire or wirelessly. Further, the harness 40 can include a power supply, heat transfer devices, global positioning devices, and the like.

Even further, in some embodiments these and other features can be modularly provided by feature packs that can connect with the harness 40 or another portion of the UPCMM 1 via a docking portion. The docking portion can form an electronic connection between the UPCMM 1 and the feature pack. In some embodiments the docking portion can provide connectivity for high-speed data transfer, power transmission, and the like. Thus, when connected to a docking portion, a feature pack can provide a modular electronic, mechanical, or thermal component to the UPCMM 1, allowing a variety of different features and functionality such as increased battery life, wireless capability, data storage, improved data processing, processing of scanner data signals, temperature control, mechanical support or ballast, or other features. The modular feature packs can contain connectors for enhanced functionality, batteries, electronic circuit boards, switches, buttons, lights, wireless or wired communication electronics, speakers, microphones, or any other type of extended functionality that might not be included on a base level product. Further, in some embodiments the feature packs can be positioned at different portions of the UPCMM 1, such as along a transfer member, an articulation member, or as an add-on to the coordinate acquisition members 50 or an associated handle.

As one example, a feature pack can include a battery, such as a primary battery or an auxiliary battery. Advantageously, in embodiments where the pack is an auxiliary battery the UPCMM 1 can include an internal, primary battery that can sustain operation of the UPCMM while the auxiliary battery is absent or being replaced. Thus, by circulating auxiliary batteries a UPCMM 1 can be sustained indefinitely with no direct power connection.

As another example, a feature pack can include a data storage device. The available data storage on the feature pack can be arbitrarily large, such that the UPCMM 1 can measure and retain a large amount of data without requiring a connection to a larger and/or less convenient data storage device such as a desktop computer. Further, in some embodiments the data storage device can transfer data to the arm, including instructions for arm operation such as new commands for the arm upon pressing of particular buttons or upon particular motions or positions of the arm, or other customizable settings.

In examples where the feature pack includes wireless capability, similar functionality can be provided as with a data storage device. With wireless capability, data can be transferred between the UPCMM 1 and an external device, such as a desktop computer, continuously without a wired connection. In some embodiments, the UPCMM 1 can continuously receive commands from the auxiliary device. Further, in some embodiments the auxiliary device can continuously display data from the arm, such as the arm's position or data points that have been acquired. In some embodiments the device can be a personal computer ("PC") and the feature pack can transmit arm coordinate data and scanner data wirelessly to the PC. Said feature pack can combine the arm data and scanner data in the feature pack before wireless transmission or transmit them as separate data streams.

In further embodiments, the feature packs can also include data processing devices. These can advantageously perform various operations that can improve the operation of the arm, data storage, or other functionalities. For example, in some embodiments commands to the arm based on arm position can be processed through the feature pack. In additional embodiments, the feature pack can compress data from the arm prior to storage or transmission.

In yet another example, the feature pack can include thermal functionality. For example, the feature pack can include a heat sink, cooling fans, or other heat transfer devices. A connection between the docking portion and the feature pack can also connect by thermally conductive members to electronics in the UPCMM 1, allowing substantial heat transfer between the UPCMM arm and the feature pack.

Further, in some embodiments the feature packs can have a size and shape substantially matching a side of the UPCMM 1 to which they connect. Thus, the feature pack can be used without substantially increasing the size of the UPCMM, reducing its possible portability, or limiting its location relative to other devices.

Again, the feature packs can be used in combination with each other and the other features described herein and/or can be used independently in other types of CMMs. Additional description of the feature packs can be found in U.S. Pat. No. 8,112,896, issued 14 Feb. 2012, which is incorporated by reference herein.

The various devices, methods, procedures, and techniques described above provide a number of ways to carry out the invention. Of course, it is to be understood that not necessarily all objectives or advantages described may be achieved in accordance with any particular embodiment described herein. Also, although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

What is claimed is:

1. A coordinate measurement machine comprising:
 a harness configured to mount to a human; and
 a coordinate measuring machine, the coordinate measuring machine's entire weight configured to be supported by human through the harness when worn by the human, the coordinate measuring machine comprising at least one of:
  an articulated arm comprising a plurality of transfer members and a plurality of articulation members connecting the plurality of transfer members to each other to measure an angle between the transfer members; and
  an optical coordinate acquisition member.

2. The coordinate measurement machine of claim 1, wherein the harness comprises a backpack.

3. The coordinate measurement machine of claim 1, wherein the harness comprises a helmet.

4. The coordinate measurement machine of claim 1, wherein the coordinate measurement machine comprises an optical coordinate acquisition member.

5. The coordinate measurement machine of claim 4, wherein the optical coordinate acquisition member comprises a laser scanner.

6. The coordinate measurement machine of claim 4, wherein the optical coordinate acquisition member comprises two or more cameras to form a stereo vision system.

7. The coordinate measurement machine of claim 4, further comprising a projector configured to provide a structured light pattern.

8. The coordinate measurement machine of claim 4, wherein the optical coordinate acquisition member is configured to measure continuously at a frequency.

9. The coordinate measurement machine of claim 1, further comprising a trackable device configured to facilitate measurement of the location of the coordinate measurement machine in space.

10. The coordinate measurement machine of claim 9, wherein the trackable device is disposed on the harness.

11. A coordinate measurement machine system comprising the coordinate measurement machine of claim 9, and further comprising a stationary tracking device configured to measure the location of the coordinate measurement machine in space using the trackable device.

12. The coordinate measurement machine system of claim 11, wherein the tracking device comprises an optical tracker.

13. The coordinate measurement machine system of claim 11, wherein the tracking device comprises a laser tracker.

14. The coordinate measurement machine system of claim 11, wherein the tracking device comprises a plurality of cameras.

15. A coordinate measurement machine system comprising the coordinate measurement machine of claim 1, and further comprising a heads-up display in operative communication with the coordinate measurement machine and configured to display information related to coordinates measured by the coordinate measurement machine to a user.

16. A coordinate measurement machine system comprising the coordinate measurement machine of claim 1, the coordinate measurement machine further comprising a docking portion configured to form a connection to a modular feature pack, the system further comprising a plurality of modular feature packs configured to electronically connect to the coordinate measurement machine and provide additional electronic functionality.

17. A coordinate measurement machine comprising:
a trackable device mounted on the coordinate measurement machine, the trackable device being configured to facilitate measurement of the location of the coordinate measurement machine in space; and
at least one of:
an articulated arm comprising a plurality of transfer members and a plurality of articulating members connecting the plurality of transfer members to each other to measure an angle between the transfer members; and
an optical coordinate acquisition member,
wherein the coordinate measurement machine is configured to be mounted to a user for hands-free use.

18. The coordinate measurement machine of claim 17, wherein the coordinate measurement machine comprises an optical coordinate acquisition member.

19. The coordinate measurement machine of claim 18, wherein the optical coordinate acquisition member comprises a laser scanner.

20. The coordinate measurement machine of claim 18, wherein the optical coordinate acquisition member comprises two or more cameras to form a stereo vision system.

21. The coordinate measurement machine of claim 18, further comprising a projector configured to provide a structured light pattern.

22. The coordinate measurement machine of claim 18, wherein the optical coordinate acquisition member is configured to measure continuously at a frequency.

23. A coordinate measurement machine system comprising the coordinate measurement machine of claim 17, and further comprising a stationary tracking device configured to measure the location of the coordinate measurement machine in space.

24. The coordinate measurement machine system of claim 23, wherein the tracking device comprises an optical tracker.

25. The coordinate measurement machine system of claim 23, wherein the tracking device comprises a laser tracker.

26. The coordinate measurement machine system of claim 23, wherein the tracking device comprises a plurality of cameras.

27. A coordinate measurement machine system comprising the coordinate measurement machine of claim 17, and further comprising a heads-up display in operative communication with the coordinate measurement machine and configured to display information related to coordinates measured by the coordinate measurement machine to a user.

28. A coordinate measurement machine system comprising the coordinate measurement machine of claim 17, the coordinate measurement machine further comprising a docking portion configured to form a connection to a modular feature pack, the system further comprising a plurality of modular feature packs configured to electronically connect to the coordinate measurement machine and provide additional electronic functionality.

29. A method for measuring one or more points comprising:
mounting a coordinate measurement machine comprising an optical coordinate acquisition member to a single person; and
measuring one or more objects with the coordinate measurement machine while the coordinate measurement machine is mounted to the single person.

30. The method of claim 29, further comprising tracking a location of the coordinate measurement machine while measuring one or more objects with the coordinate measurement machine, and while the coordinate measurement machine is mounted to the single person.

31. A method for measuring one or more points, comprising:
carrying a coordinate measurement machine comprising an optical coordinate acquisition member by a user;
measuring one or more objects with the coordinate measurement machine while carried by the user; and
tracking a location of the coordinate measurement machine while measuring said one or more objects.

32. A coordinate measurement machine comprising a trackable device mounted on the coordinate measurement machine, the trackable device being configured to facilitate measurement of the location of the coordinate measurement machine in space.

33. A coordinate measurement machine system comprising the coordinate measurement machine of claim 32, and further comprising a stationary tracking device configured to measure the location of the coordinate measurement machine in space.

34. The coordinate measurement machine system of claim 33, wherein the tracking device comprises an optical tracker.

35. The coordinate measurement machine system of claim 33, wherein the tracking device comprises a laser tracker.

36. The coordinate measurement machine system of claim 33, wherein the tracking device comprises a plurality of cameras.

37. A coordinate measurement machine system comprising the coordinate measurement machine of claim 32, and further comprising a heads-up display in operative communication with the coordinate measurement machine and configured to display information related to coordinates measured by the coordinate measurement machine to a user.

38. A coordinate measurement machine system comprising the coordinate measurement machine of claim 32, the coordinate measurement machine further comprising a docking portion configured to form a connection to a modular feature pack, the system further comprising a plurality of modular feature packs configured to electronically connect to the coordinate measurement machine and provide additional electronic functionality.

* * * * *